US012260982B2

(12) United States Patent
Yan et al.

(10) Patent No.: US 12,260,982 B2
(45) Date of Patent: Mar. 25, 2025

(54) HIGH CURRENT COUPLED WINDING ELECTROMAGNETIC COMPONENT

(71) Applicant: EATON INTELLIGENT POWER LIMITED, Dublin (IE)

(72) Inventors: Yipeng Yan, Pleasanton, CA (US); Dengyan Zhou, Shanghai (CN); Tingjun Zhou, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 706 days.

(21) Appl. No.: 17/358,387

(22) Filed: Jun. 25, 2021

(65) Prior Publication Data

US 2021/0407729 A1 Dec. 30, 2021

(30) Foreign Application Priority Data

Jun. 28, 2020 (CN) ......................... 202010596981.6

(51) Int. Cl.
*H01F 27/28* (2006.01)
*H01F 27/24* (2006.01)
*H01F 27/29* (2006.01)
*H01F 41/04* (2006.01)

(52) U.S. Cl.
CPC ............. *H01F 27/29* (2013.01); *H01F 27/24* (2013.01); *H01F 41/04* (2013.01)

(58) Field of Classification Search
CPC ........ H01F 27/29; H01F 27/292; H01F 27/24; H01F 27/2852; H01F 27/306; H01F 27/266; H01F 27/2847; H01F 38/14
See application file for complete search history.

(56) References Cited

U.S. PATENT DOCUMENTS

| | | | | |
|---|---|---|---|---|
| 5,574,420 A * | 11/1996 | Roy | H01F 17/0033 336/200 |
| 8,102,233 B2 | 1/2012 | Ikriannikov | |
| 8,174,348 B2 | 5/2012 | Ikriannikov | |
| 9,202,617 B2 | 12/2015 | Zhou et al. | |
| 9,842,682 B2 | 12/2017 | Yan et al. | |
| 2010/0156194 A1* | 6/2010 | Navid | H02J 3/01 307/105 |
| 2013/0015932 A1* | 1/2013 | Cho | H01F 27/2823 336/182 |
| 2017/0178794 A1* | 6/2017 | Yan | H01F 41/02 |
| 2018/0068778 A1* | 3/2018 | Narayanan | H01F 3/14 |
| 2018/0301276 A1* | 10/2018 | Yeh | H01F 27/292 |

(Continued)

OTHER PUBLICATIONS

Technical Disclosure Commons, "Fast multi-phse trans-inductor voltage regulator", May 9, 2019 obtained from https://www.tdcommons.org/dpubs_series/2194.

*Primary Examiner* — Mang Tin Bik Lian
(74) *Attorney, Agent, or Firm* — Baker Botts L.L.P.

(57) ABSTRACT

An electromagnetic component includes a magnetic core and a dual-winding arrangement inside the magnetic core structure. The dual-winding arrangement includes a first winding fabricated from an elongated conductor having a first thickness and defining a first inverted U-shaped main winding portion including out of plane axial bends, and a second winding fabricated from a conductor having a second thickness and being formed into a second inverted U-shaped main winding portion with perpendicular sections extending co-planar to one another without any out of plane axial bends.

21 Claims, 26 Drawing Sheets

(56) References Cited

U.S. PATENT DOCUMENTS

| | | | | |
|---|---|---|---|---|
| 2019/0214181 | A1* | 7/2019 | Wang | H01F 27/306 |
| 2019/0214186 | A1* | 7/2019 | Inaba | H01F 27/24 |
| 2019/0378643 | A1* | 12/2019 | Zhou | H01F 27/2823 |
| 2020/0227205 | A1* | 7/2020 | Ji | H01F 41/04 |
| 2020/0295665 | A1* | 9/2020 | Jimichi | H01F 27/24 |

* cited by examiner

HIGH CURRENT COUPLED WINDING ELECTROMAGNETIC COMPONENT

CROSS REFERENCE TO RELATED APPLICATIONS

This application claims the benefit of Chinese patent application number 202010596981.6 filed Jun. 28, 2020, the entire disclosure of which is hereby incorporated by reference in its entirety.

BACKGROUND OF THE INVENTION

The field of the invention relates generally to electromagnetic components, and more particularly to a surface mount electromagnetic component having a plurality of magnetically coupled coil windings for circuit board applications.

Electromagnetic components such as inductors and transformers are known that include a magnetic core and one or more conductors defining a coil or winding in the magnetic core. In such components, electrical current flow through the coil(s) or winding(s) in the component generates a magnetic field according to well-known electromagnetic principles that may be harnessed in combination with the magnetic core for desirable purposes in an electrical power distribution system. In an inductor component, the magnetic field(s) can be productively used to store energy in the magnetic core, release energy from the magnetic core, and regulate a voltage output. In a transformer component, current flowing in a first coil or winding can induce a current flow in a second coil or winding to step-up or step-down a voltage input, as well as regulate the voltage output. In some cases, an electromagnetic component may combine the function of a transformer and an inductor component, and in multiphase power systems the conductors may be magnetically coupled to one another to produce still other desirable effects and advantages in an electrical power distribution system.

For certain applications, the construction of such components can be undesirably complicated and expensive to produce the desired results. Improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
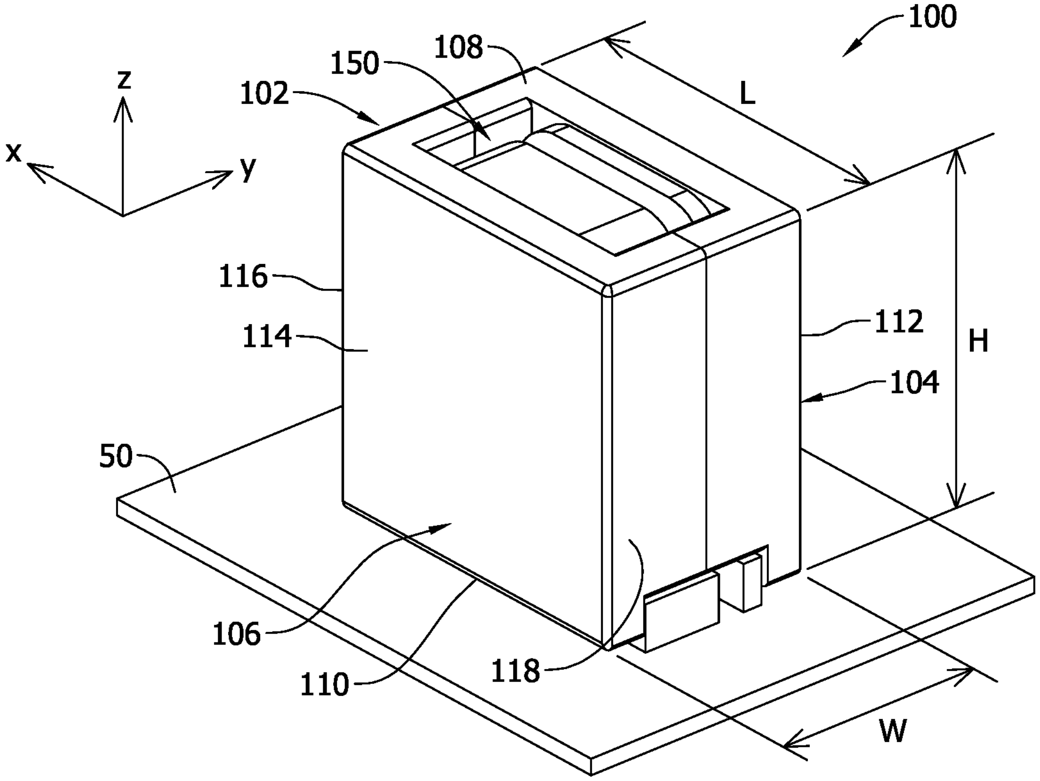
FIG. 1 is a top perspective view of a first exemplary embodiment of a surface mount, electromagnetic component assembly including a plurality of magnetically coupled windings.

In view of industry trends toward smaller electromagnetic components, demands are now imposed on electromagnetic component manufacturers to provide smaller components without comprising performance attributes. Such smaller electromagnetic components can be mounted on a circuit board with increased component density. Demands for increasingly smaller components are difficult to meet in an economical manner, however, for certain applications involving higher-power, higher current circuitry. Certain multi-phase power applications implemented on circuit boards present additional challenges to the industry to provide smaller components with the desired performance capability in reduced package sizes.

For example, multi-phase transformer-inductor voltage regulator (TLVR) modules implemented on circuit boards are desirable in data center applications including servers operating with rapidly fluctuating current reaching high levels. TVLR modules are known that include magnetically coupled windings to provide the desired regulated voltage output, but tend to be complicated and expensive to manufacture in a smaller size without impacting performance considerations. Multiple-phase voltage regulator module (VRM) circuit board components are likewise known that employ magnetically coupled windings which provide desirable performance in various power system applications, but likewise are complicated and expensive to manufacture in a smaller size without impacting performance considerations. Multi-phase transformer components are also known for higher voltage and lower voltage circuit board power system applications that are also complicated and expensive to manufacture in a smaller size without impacting performance considerations.

Electromagnetic components are known for use in multi-phase circuit board applications such as those above that desirably include multiple, magnetically coupled windings integrated in a common core structure that reduce the size of the components relative to discrete components each having a single winding in a separate magnetic core structure. Existing electromagnetic components of this type however, are disadvantaged in some aspects and improvements are desired, particularly for relatively high current, high power multi-phase power systems wherein further size reduction in package size is desired in a cost effective manner.

Embodiments of improved electromagnetic component assemblies are described hereinbelow that are manufacturable at lower cost and in desired package sizes while offering acceptable coupled winding performance for the applications described above. This is achieved at least in part via a number of relatively low cost, simply shaped and easily manufactured modular component parts that may be mixed and matched in different combinations to provide a variety of different electromagnetic components from a small inventory of modular parts. Unique, space saving dual-winding arrangements having distinct windings of different fabrication and thickness are also provided and oriented in a manner in a magnetic core structure to facilitate reduction in the footprint of the components of the circuit board relative to conventional electromagnetic component constructions. Method aspects will be in part apparent and in part explicitly discussed in the following description.

Figure 2:
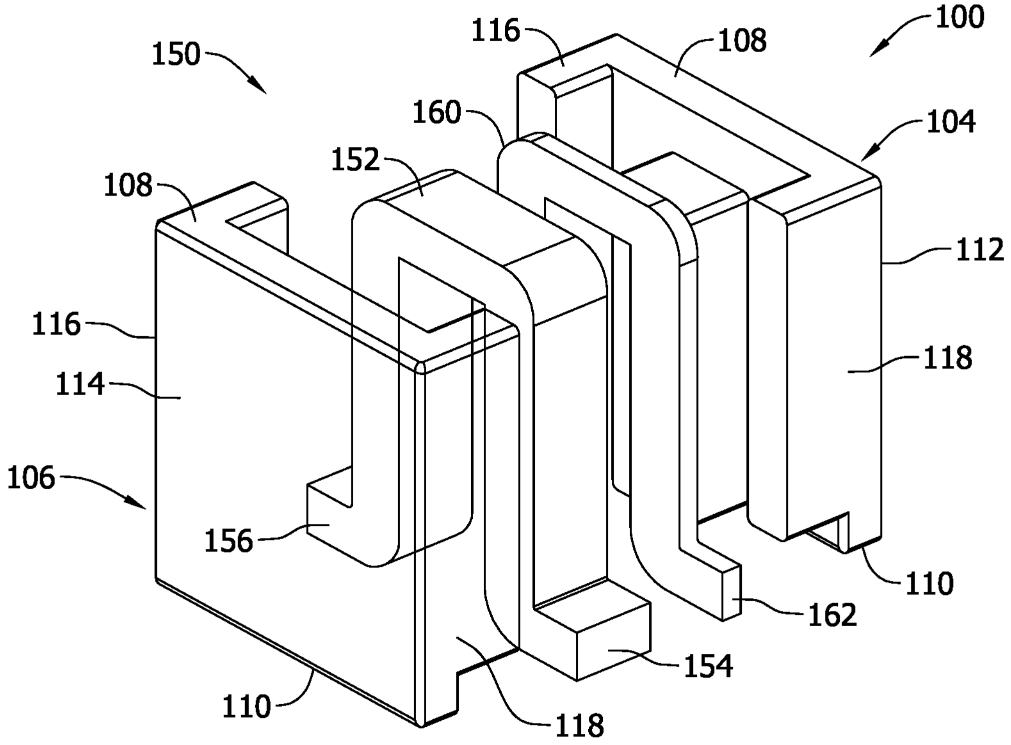
FIG. 2 is an exploded view of the electromagnetic component assembly shown in FIG. 1.
Figure 3:
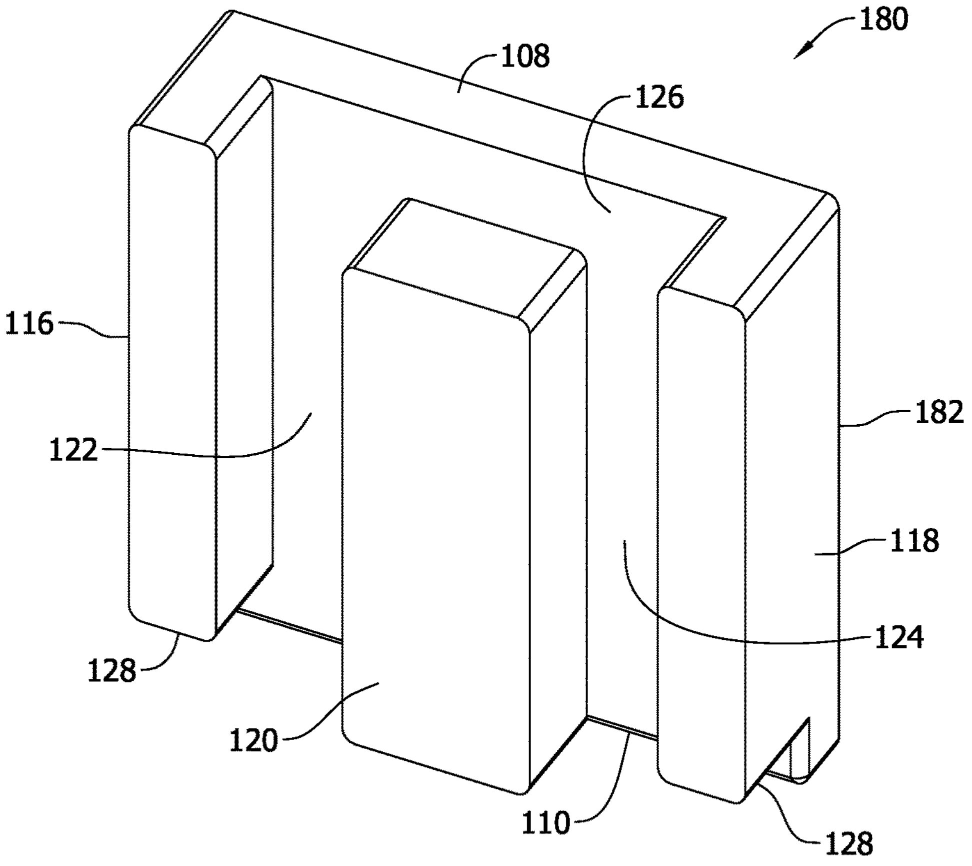
FIG. 3 is a perspective view of a first exemplary embodiment of a magnetic core piece for the component shown in FIGS. 1 and 2.
Figure 4:
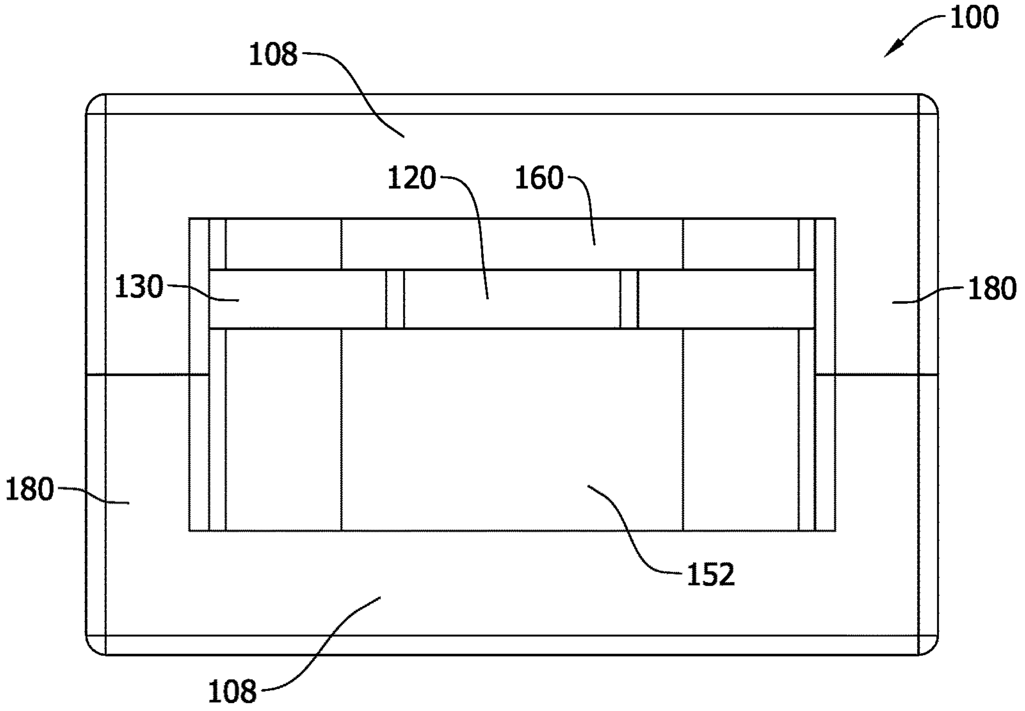
FIG. 4 is a top view of the component shown in FIGS. 1 and 2 and including magnetic core pieces as shown in FIG. 3.

FIGS. 1-4 illustrate various views of a first exemplary embodiment of a surface mount, electromagnetic component assembly 100. FIG. 1 shows the electromagnetic component assembly 100 in perspective view. FIG. 2 is an exploded view of the electromagnetic component assembly 100. FIG. 3 is a perspective view of a magnetic core piece for the electromagnetic component assembly 100, and FIG. 4 is a top view of the electromagnetic component assembly 100.

The electromagnetic component assembly 100 generally includes a circuit board 50, a magnetic core structure 102, and a space saving dual-winding arrangement 150 situated within the magnetic core structure 102.

The magnetic core structure 102 in the example shown is fabricated from first and second magnetic core pieces 104, 106 assembled about the dual-winding arrangement 150. When assembled as shown, the magnetic core pieces 104, 106 in combination define the larger magnetic core structure 102 including a number of generally orthogonal side walls imparting an overall rectangular or box-like shape and appearance. The box-like shape of the magnetic core structure 102 in the illustrated example has an overall length L measured along a first dimensional axis such as an x axis of a Cartesian coordinate system, a width W measured along a second dimensional axis perpendicular to the first dimension axis such as a y axis of a Cartesian coordinate system, and a height H measured along a third dimensional axis extending perpendicular to the first and second dimensional axes such as a z axis of a Cartesian coordinate system. As shown, the height dimension H is much greater than the width dimension W and is slightly greater than the length dimension L.

The dimensional proportions in length, width and height dimensions of the magnetic core structure 102 runs counter to alternative approaches in the art to reduce the height dimension H as much as possible to produce a so-called low profile component. In higher power, higher current circuitry, as the height dimension H is reduced the dimension W (and perhaps L as well) tends to increase to accommodate larger coil windings capable of performing in higher current circuitry. As a result, any reduction in height dimension H tends to increase the width W or length L and therefore increases the footprint of the component on the circuit board 50 in the x, y plane of the circuit board 50. In contrast, the magnetic core structure 102 of the present invention, however, favors an increased height dimension H (and an increased component profile in the y, z plane measured perpendicular to the x, y plane of the circuit board 50) in favor of a smaller footprint on the circuit board 50 in the x, y plane. Component density of the circuit board 50 may accordingly be increased by virtue of the smaller footprint of the component 100 on the circuit board 50.

In a contemplated embodiment, the magnetic core structure 102 may be assembled from modular magnetic core pieces 104, 106 each fabricated utilizing known soft magnetic particle materials and known techniques such as molding of granular magnetic particles to produce the desired shapes. Soft magnetic powder particles used to fabricate the magnetic core pieces may include Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, and other suitable materials known in the art. In some cases, magnetic powder particles may be are coated with an insulating material such that the magnetic core pieces may possess so-called distributed gap properties familiar to those in the art and fabricated in a known manner. The modular magnetic core pieces 104, 106 may be fabricated from the same or different magnetic materials and as such may have the same or different magnetic properties as desired.

The modular magnetic core pieces 104, 106 in the example of FIGS. 1-4 are identically sized and shaped but inverted relative to one another in a mirror-image arrangement on either side of the dual-winding arrangement 150. Each of the magnetic core pieces 104, 106 therefore defines 50% or ½ of the magnetic core structure 102. In the example shown, each magnetic core piece 104, 106 is formed in the shape of the exemplary modular magnetic core piece 180 (FIG. 3) with opposing partial top and bottom walls 108 and 110 and a longitudinal side wall 182 interconnecting the top and bottom walls 108, 110. The longitudinal side wall 182 has height dimension H and length dimension L, and when the component 100 is assembled (FIG. 1) the longitudinal side wall 182 defines either the longitudinal wall 112 or 114 in the magnetic core structure 102 as shown.

The exemplary core piece 180 (FIG. 3) further includes opposing first and second partial lateral side walls 116 and 118 extending from the longitudinal side wall 182. Each of the partial top and bottom walls 108, 110 forms ½ of the top wall 108 and bottom wall 110 in the assembled component 100 as shown in FIG. 1 and FIG. 4, while each of the partial lateral side walls 116 and 118 forms ½ of the lateral side walls 116 and 118 in the assembled component 100. As such, the partial side walls 116, 118 in the magnetic core piece 180 defines ½ of the dimension W of the completed component 100.

In the context of the present description, the "bottom" wall 110 of the magnetic core structure 102 is located adjacent the x, y plane of the circuit board 50 and the "top" wall is located at the distance H from the x, y plane of the circuit board 50. The top wall 108 in the completed component 100 is generally flat and planar with a centrally located, generally rectangular opening that exposes a portion of the dual-winding arrangement 150 at the top end of the component 100. The opposing bottom surface 110 of the component 10 columns 0 is also generally flat and planar, and extends in contact with the circuit board, or extends slightly spaced from but extending generally parallel to the x, y plane of the circuit board 50 in FIG. 1.

In the example modular magnetic core piece 180 that may be used as the modular magnetic core pieces 104, 106 in the component 100 the exterior surfaces of the lateral side walls 116, 118 and the exterior surface of the longitudinal side wall 182 is generally flat and planar, while the interior surface of the longitudinal side wall 182 includes a center guide element 120 (FIG. 4) projecting therefrom as a column in between the interior surfaces of the lateral side walls 116, 118. The projecting guide element 120 extends perpendicularly from the bottom wall 110 and defines vertical slots 122, 124 extending alongside the lateral side walls 116, 118. The projecting guide element 120 extends vertically for a distance less than the dimension H which in turn defines a horizontal slot 126 above the upper end of the guide element 120. The slots 122, 124, 126 receive corresponding vertical and horizontal portions of the dual-winding arrangement 150 shown in FIG. 2. Moreover, and in the example shown, the bottom wall 110 in the core piece 180 includes cut-out portions 128 on the forward portion of each side wall 116, 118 that respectively receive portions of the surface mount terminals of the dual-winding arrangement 150 in a compact manner. When the surface mount terminals are received in the cut-out portions, the surface mount terminals are generally flush with the exterior surface of the side walls 116*m* 118 and do not protrude from the magnetic core structure 102.

The dual-winding arrangement 150 includes a first conductive winding 152 and a second conductive winding 160 that are separately fabricated from one another using a known conductive material such a metal or metal alloy familiar to those in the art. The winding 152 and the winding 160 are spaced apart from another but still close enough to one another to magnetically couple the windings 152, 160 inside the magnetic core structure 102. Each of the conductive windings 152, 160 in the example shown is formed with a U-shaped main winding portion including elongated vertically extending leg sections that are received in the slots 122, 124 of the modular magnetic core piece 180, and a shorter top section extending generally perpendicular to the vertical leg elements and that is received in the horizontal slot 126 in the modular magnetic core piece 180.

The winding 152 is fabricated from a relatively thick elongated conductor that may for example, be cut or stamped as an axially elongated strip from a larger and generally planar piece of electrically conductive material. The axially elongated strip of material is then bent out of plane into the geometry shown including a three-dimensional inverted U-shaped main winding portion. Along the axis of the conductor, the inverted U-shaped main winding portion is defined by vertically extending parallel legs spaced apart but extending parallel to one another with a top section interconnecting the vertically extending legs in a perpendicular manner. Out of plane 90° bends transition the thick strip of conductive material between the mutually perpendicular vertical legs and the top section of the U-shaped main winding portion. The vertical legs of the inverted U-shaped main winding portion in the winding 152 each extend axially in the conductor in a direction parallel to the y, z plane relative to the circuit board 50 (i.e., perpendicular to the major surface of the circuit board) while the top section extends axially in a direction parallel to the x, y plane of the circuit board 50 (i.e., parallel to the major surface of the circuit board).

In contrast to the winding 152, the winding 160 is stamped from a relatively thin and planar sheet of conductive material into an inverted U-shaped main winding portion including vertical legs and a top section residing in the same plane. Unlike the winding 152, the inverted U-shaped main winding portion in the winding 160 includes co-planar vertical legs and top section, and consequently there are no out-of-plane bends in the winding 160 where the vertical and horizontal portions of the windings intersect. That is, the intersecting portions of the legs and top section in the U-shaped main winding portion of the winding 160 extend in the same plane as the legs and the top section. As seen in FIG. 1, the plane of the inverted U-shaped main winding portion in the winding 160 is oriented to extend parallel to the x, z plane relative to the circuit board 50.

In comparison, and due to the differences in how the windings 152, 160 are formed and fabricated, along the y axis and the width dimension W in the completed component 100, the winding 152 is wider than the winding 160. In the example illustrated, the width of the winding 152 is about five times as much as the width of the winding 160. In the dimensions L and H, however, the windings 152 and 160 are about equal such that inverted U-shaped windings of equal size are realized in the x, z plane in each winding 152, 160. Because of the smaller width of the winding 160 relative to the winding 152, however, the cross-sectional area of the winding 160 is significantly smaller throughout the inverted U-shaped main winding portion relative to the winding 150. The reduced width of the winding 160 facilitates a reduction in the width dimension W of the completed component 100 relative to conventional components including windings having the same width, while the magnetically coupled windings 152, 160 still provide the desired performance in the output of the component 100.

In the example component 100 shown, the bottom ends of the windings 152, 160 are further formed to include respective pairs of surface mount termination pads 154, 156 and 162, 164 that may be connected to the circuit board 50 using known soldering processes. In each case, the surface mount termination pads 154, 156 and 162, 164 extend perpendicularly to an axis of the vertical legs in each winding 152, 160. In the winding 152 the surface mount termination pads 154, 156 extend perpendicular to the vertical legs of the main winding portion while in the winding 160 the surface mount termination pads extend co-planar with the vertical legs of the main winding portion. The pairs of surface mount termination pads 154, 156 and 162, 164 extend generally coplanar to one another on the bottom side 110 of the magnetic core structure 102 to mount to the surface of the circuit board 50, but also extend in opposite directions to one another toward each lateral side wall 116, 118 of the magnetic core structure 102. Because of the differences in width between the windings 152, 160, the surface mount termination pads 154, 156 provide a larger surface area for surface mounting to the circuit board 50 than the termination pads 162, 164.

The windings 152, 160 including the termination pads 154, 156 and 162, 164 are rather simply shaped and may therefore be fabricated at relatively low cost. The modular magnetic core piece 180 that is used as the magnetic core pieces 104, 106 is likewise rather simply shaped and may be fabricated at low cost. The windings 152, 160 may be fabricated in advance as separate elements for assembly with the modular magnetic core pieces described. That is, the windings 152, 160 may be pre-formed in the shape as shown for later assembly with the magnetic core pieces. The U-shaped main winding portions in the windings 152, 160 define less than one complete turn in the main winding portions in the magnetic core and are therefore less complicated to manufacture and more easily assembled in the magnetic core structure than larger and more complex multi-turn windings.

As shown in FIG. 4 windings 152, 160 are each positioned alongside the longitudinal wall in each magnetic core piece 180, with a physical air gap extending therebetween to achieve the desired amount of magnetic coupling of the windings 152, 160 in the separated main winding portions in each winding 152, 160. In the example shown, the winding 152 occupies an entire interior space of one of the magnetic core pieces 180 and extends partly into the interior space of the other magnetic core piece 180 while the winding 160 occupies a small portion of the interior space of only of the magnetic core pieces 180. Both of the windings 152, 160 are contained in a laterally spaced and separated, side-by-side orientation between the first and second core piece 180. Each of the top sections of both windings 152, 160 are also exposed in the opening at the top side wall 108 of the magnetic core structure 102.

The circuit board 50 is configured with multi-phase power supply circuitry, sometimes referred to as line side circuitry including conductive traces (not shown) provided on the plane of the circuit board in a known manner. In the example shown in FIG. 1, the line side circuitry provides two phase electrical power, and in contemplated embodiments a first conductive trace corresponds to a first phase of the multi-phase power supply circuitry and a second conductive trace corresponds to the second phase of the multi-phase power supply circuitry. In turn, the first conductive winding 152 is connected to the first conductive trace and the first phase, and the second conductive winding 160 is connected to the second conductive trace and the second phase of the multi-phase power supply circuitry. While a two phase power system has been described, greater numbers of phases in the multi-phase power supply circuitry may alternatively be provided as illustrated in the following Figures by addition additional dual winding arrangements 150 and additional modular magnetic core pieces. That is, and as explained below, the component 100 may alternatively be configured in modular form for four, six or eight phase power systems. The modular concept is generally scalable to accommodate any number of windings and corresponding phases of electrical power.

It is understood that more than one electromagnetic component 100 may also be provided on the circuit board 50 as desired. Other types of circuit components may likewise be connected to the circuit board 50 to complete, for example, a power regulator circuit and/or a power converter circuit on the board 50. Multi-phase power applications such as multi-phase transformer-inductor voltage regulator (TLVR) circuitry, voltage regulator module (VRM) circuitry and multi-phase transformer circuitry may benefit from the coupled windings in the component 100 to reduce the size, complexity and expense of the power distribution system. As TVLR and VRM circuitry is generally known and within the purview of those in the art, no further description of the circuitry is believed to be necessary.

While not shown in FIG. 1, circuit traces are also included on the circuit board 50 to establish electrical connection to load side circuitry 118 downstream from the conductive windings 152, 160 in the circuitry.

Figure 5:
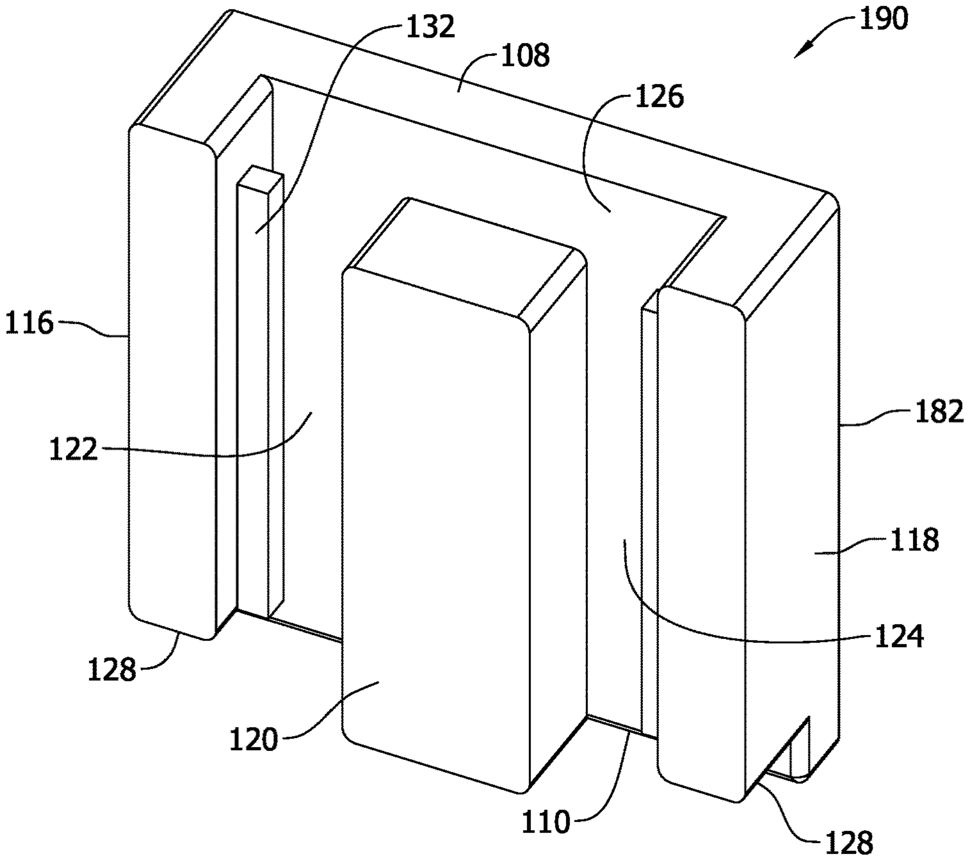
FIG. 5 is a perspective view of a second exemplary embodiment of a magnetic core piece for the component shown in FIGS. 1 and 2.

FIG. 5 is a perspective view of a second exemplary embodiment of a second exemplary modular magnetic core piece 190 for another component including magnetically coupled windings. The magnetic core piece 190 is seen to be similar to the core piece 180, but further includes built-in separator columns 132 extending from each interior surface of the lateral side walls 116, 118 and partly into the vertical slots 122, 124 on the interior surface of the core piece 190. The separator columns 132 are further spaced from but extend parallel to the longitudinal side wall 182 in the width dimension W of the component such that the width of the winding 160 is generally received and captured between the separator columns 132 and the rear wall 182.

While a pair of built-in separator columns 132 are shown, it is appreciated that only one separator column 132 may suffice in another embodiment. It is further appreciated that similar separator columns may be extended from the center guide element 120 in the core piece 190 in addition to or in lieu of the columns 132 extending from the side walls of the core piece 190. Finally it is appreciated that elongated separator columns 132 as shown are not necessarily desired to obtain or maintain the desired separation of the windings 152, 160 and alternative but still built-in separator features to the core piece 190 are therefore possible.

Figure 6:
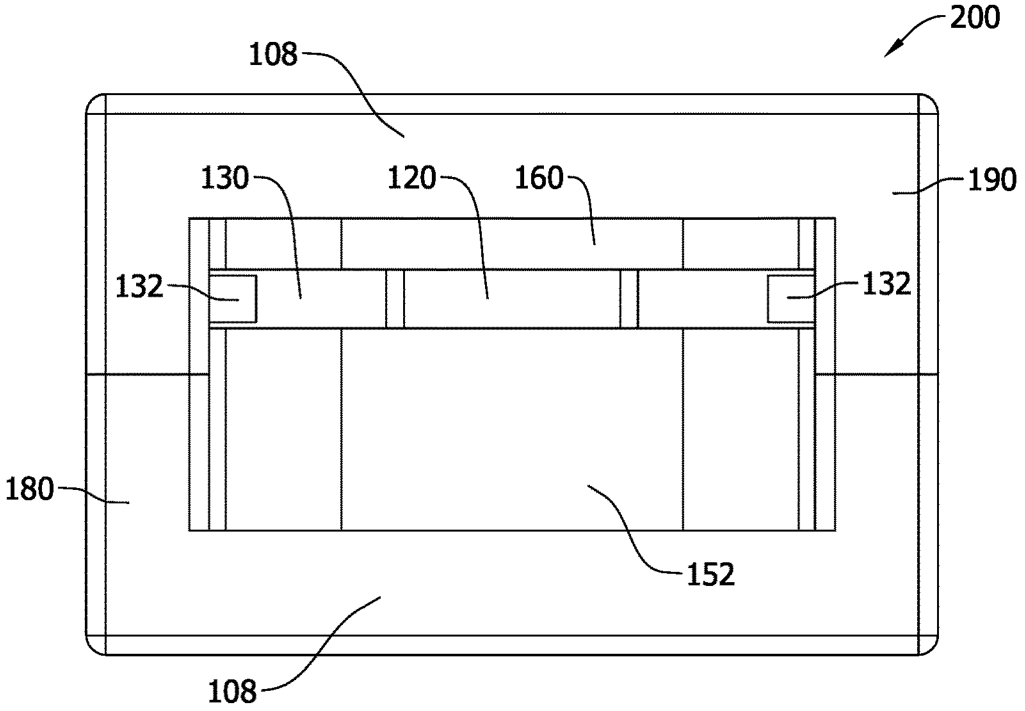
FIG. 6 is a top view of an exemplary second embodiment of a surface mount, electromagnetic component assembly including a plurality of magnetically coupled windings and the core piece shown in FIG. 5.

FIG. 6 is a top view of an exemplary second embodiment of a surface mount, electromagnetic component assembly 200 that may be used in addition to or in lieu of the component 100 described above on the circuit board 50. The component 200 is assembled from a core piece 180 and a core piece 190 arranged about the dual-winding arrangement 150. The separator columns 132 in the magnetic core piece 190 holds each of the windings 152, 160 in place with a predetermined amount of separation between the windings 152, 160 but still achieving a desired degree of magnetic coupling between the windings 152, 160. In between the separator columns 132 is a physical air gap 130 as shown.

Figure 7:
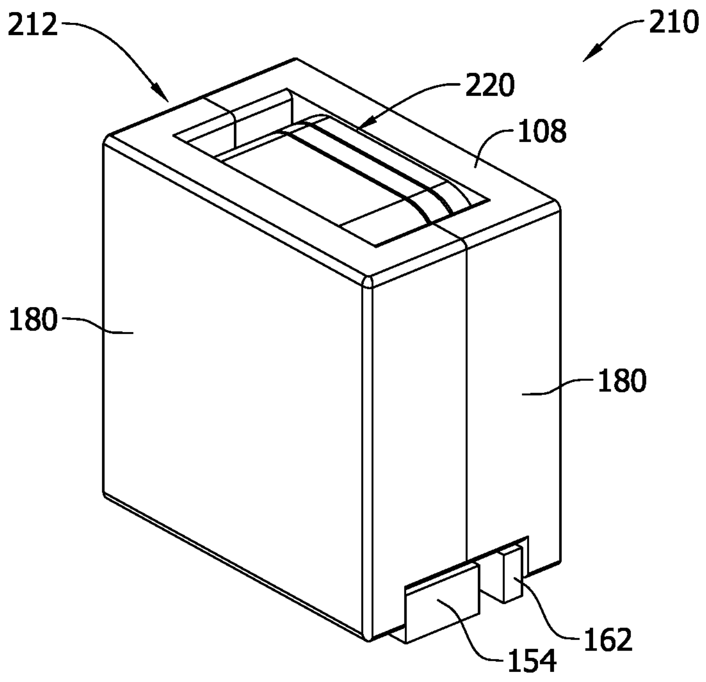
FIG. 7 is a top perspective view of a third exemplary embodiment of a surface mount, electromagnetic component assembly including a plurality of magnetically coupled windings.
Figure 8:
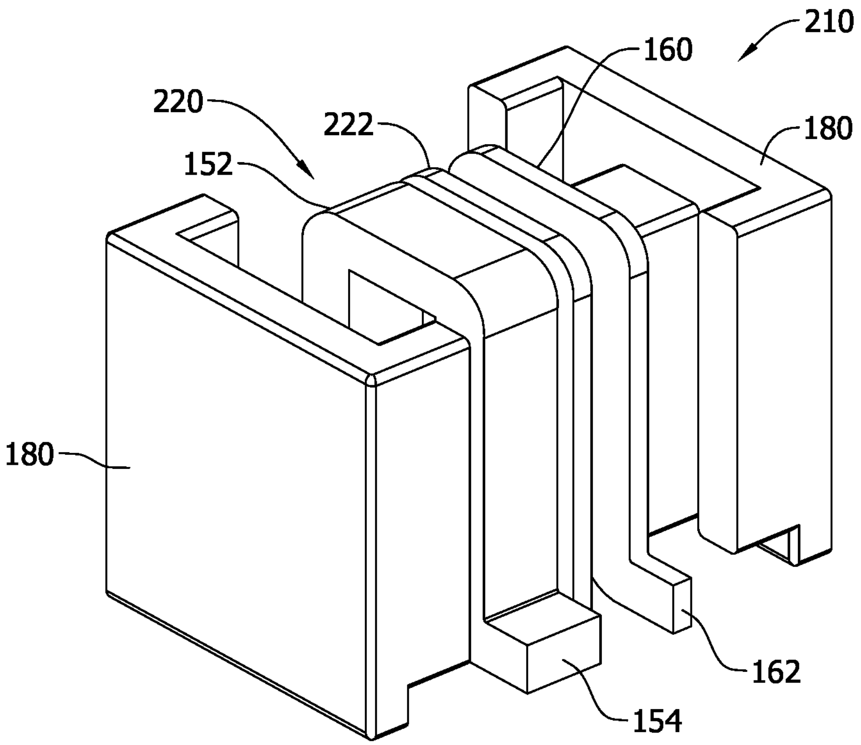
FIG. 8 is an exploded view of the electromagnetic component assembly shown in FIG. 7.
Figure 9:
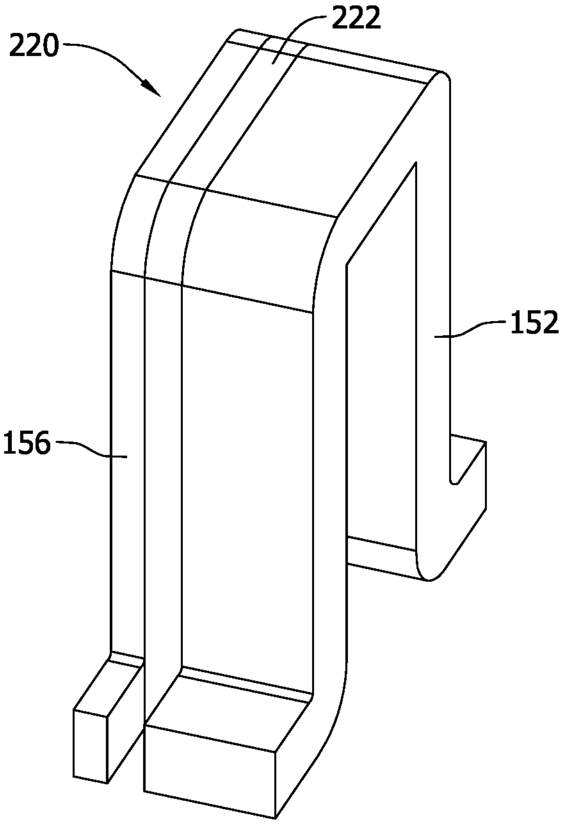
FIG. 9 is a side perspective view of a dual-winding subassembly for the component shown in FIGS. 7 and 8.

FIG. 7-9 are various view of a third exemplary embodiment of a surface mount electromagnetic component assembly 210 that may be used in addition to or in lieu of the components 100 and 200 described above on the circuit board 50. The component 210 generally includes a magnetic core structure 102 assembled from first and second magnetic core pieces 180 with a space saving dual-winding arrangement 220 arranged therebetween.

Figure 10:
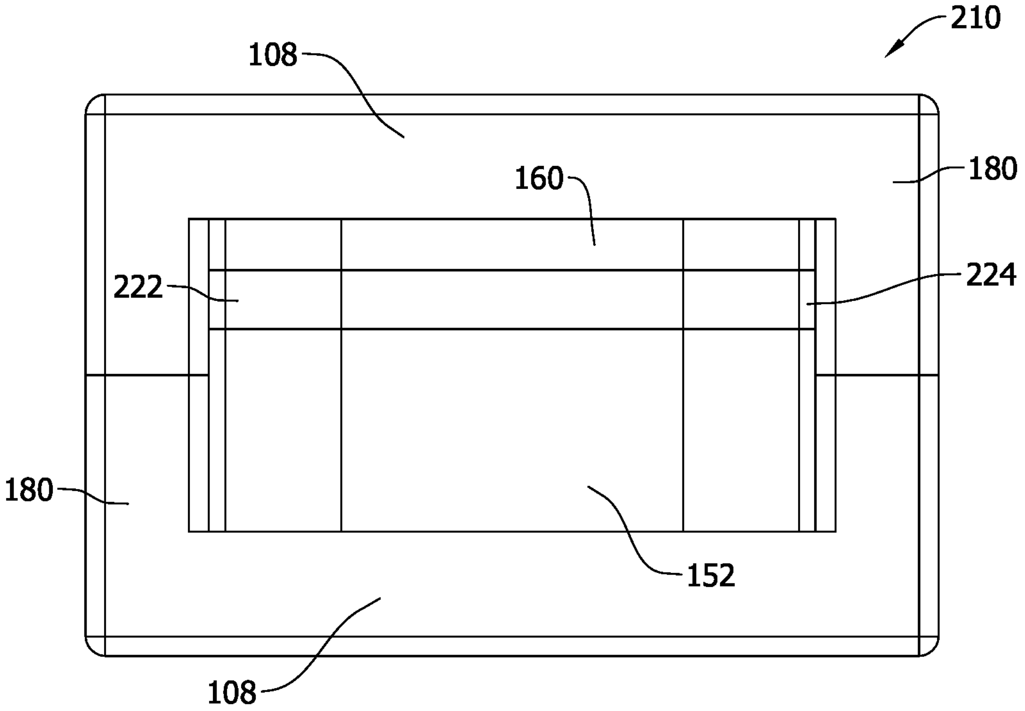
FIG. 10 is a top view of the component shown in FIGS. 7 and 8.

As shown in FIGS. 8 and 9, the dual-winding arrangement 220 includes the winding 152 and the winding 160 with a separator element 222 therebetween. The separator element 222 may be fabricated from a magnetic or non-magnetic material to achieve the desired amount of magnetic coupling between the windings 152 and 160. The separator element 222 is formed in an inverted U-shape that may be received in the slots 122, 124, 126 in the magnetic core pieces 180. As shown in FIG. 10, the separator element 222 secures the windings 152, 160 in place in the completed component 210. Optionally, air gaps 224 may be provided on each end of the separator element 222 for enhanced operation of the component 210.

Figure 11:
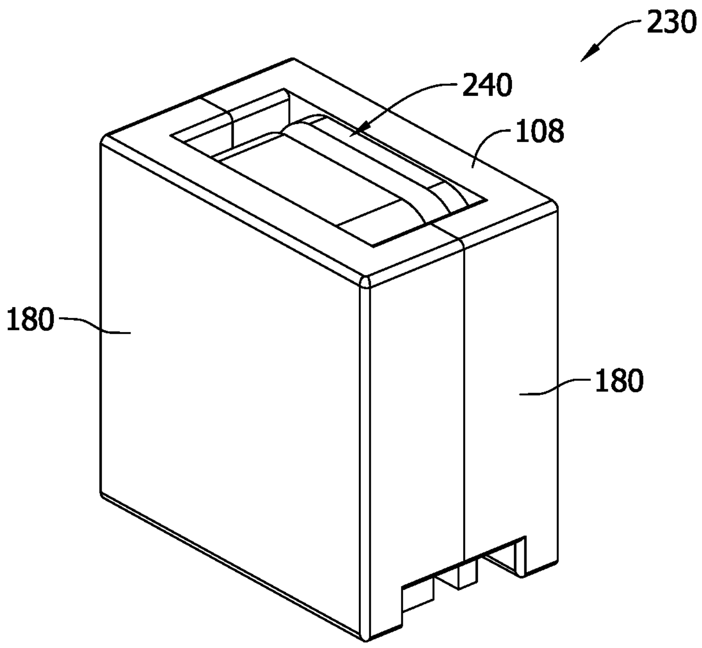
FIG. 11 is a top perspective view of a fourth exemplary embodiment of a surface mount, electromagnetic component assembly including a plurality of magnetically coupled windings.
Figure 12:
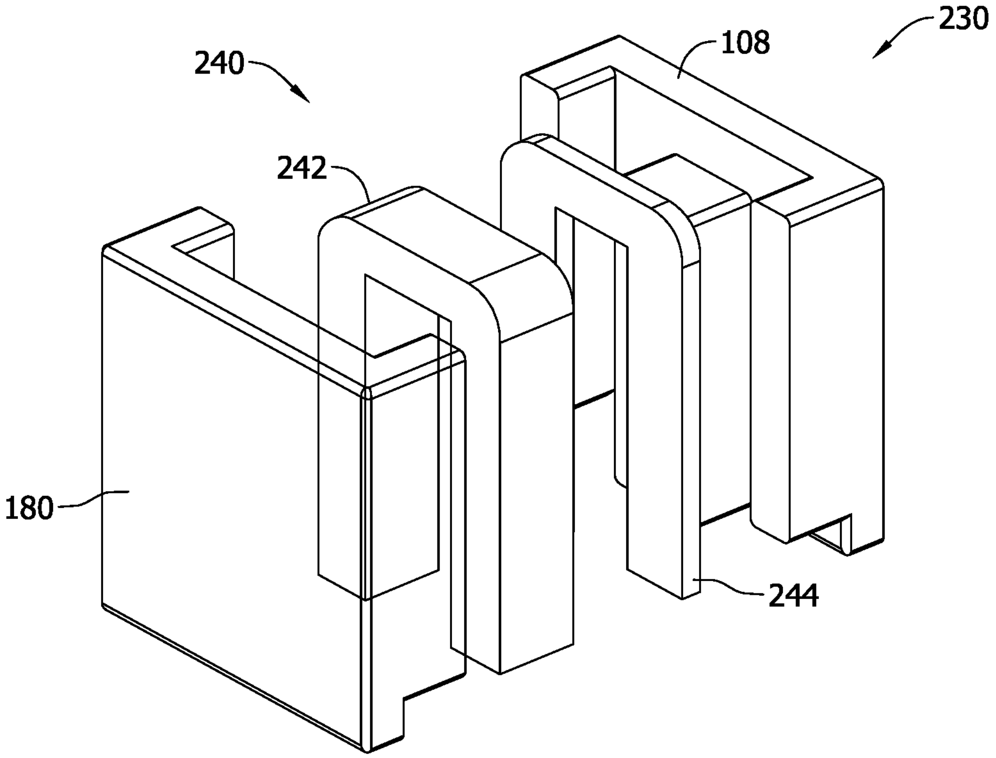
FIG. 12 is an exploded view of the electromagnetic component assembly shown in FIG. 11.
Figure 13:
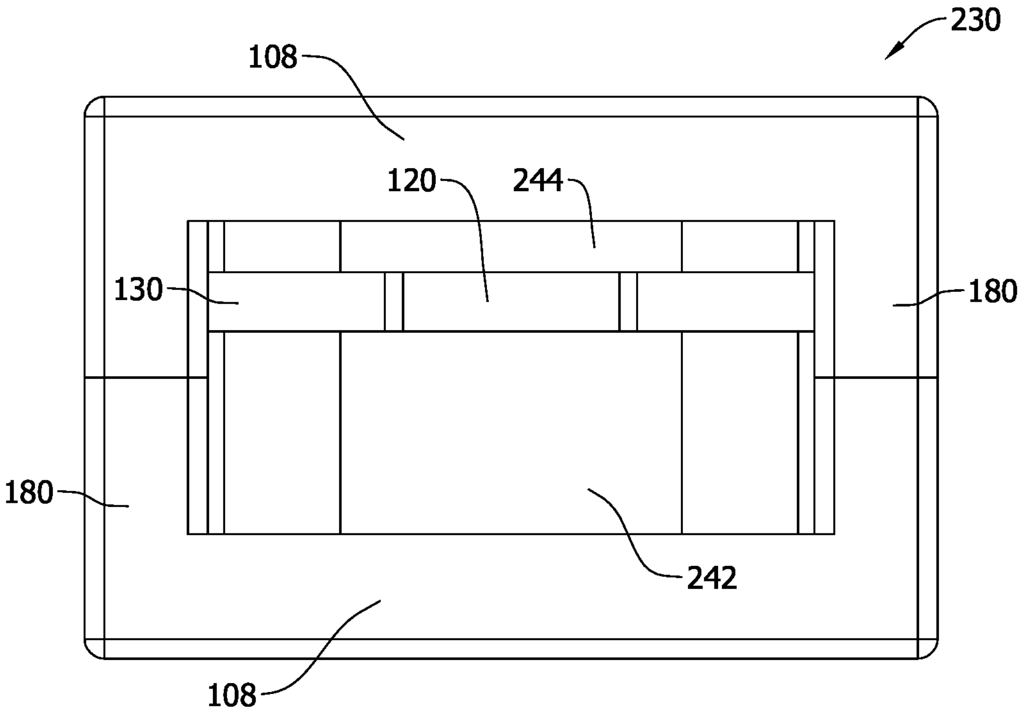
FIG. 13 is a top view of the component shown in FIGS. 11 and 12.

FIG. 11-13 are various view of a fourth exemplary embodiment of a surface mount electromagnetic component assembly 230 that may be used in addition to or in lieu of the components 100, 200 and 210 described above on the circuit board 50. The component 230 generally includes a magnetic core structure 102 assembled from first and second magnetic core pieces 180 with a space saving dual-winding arrangement 240 arranged therebetween.

The dual-winding arrangement 240 includes windings 242, 244 similar to the windings 152, 160 in the arrangement 150 described above, but in the windings 242, 244 the surface mount termination pads 154, 156 and 162, 164 of the windings 152, 160 are omitted. In the winding arrangement 240 the distal ends of the vertical legs in each winding 242, 244 are soldered to the circuit board 50 without providing larger surface mount termination pads.

Figure 14:
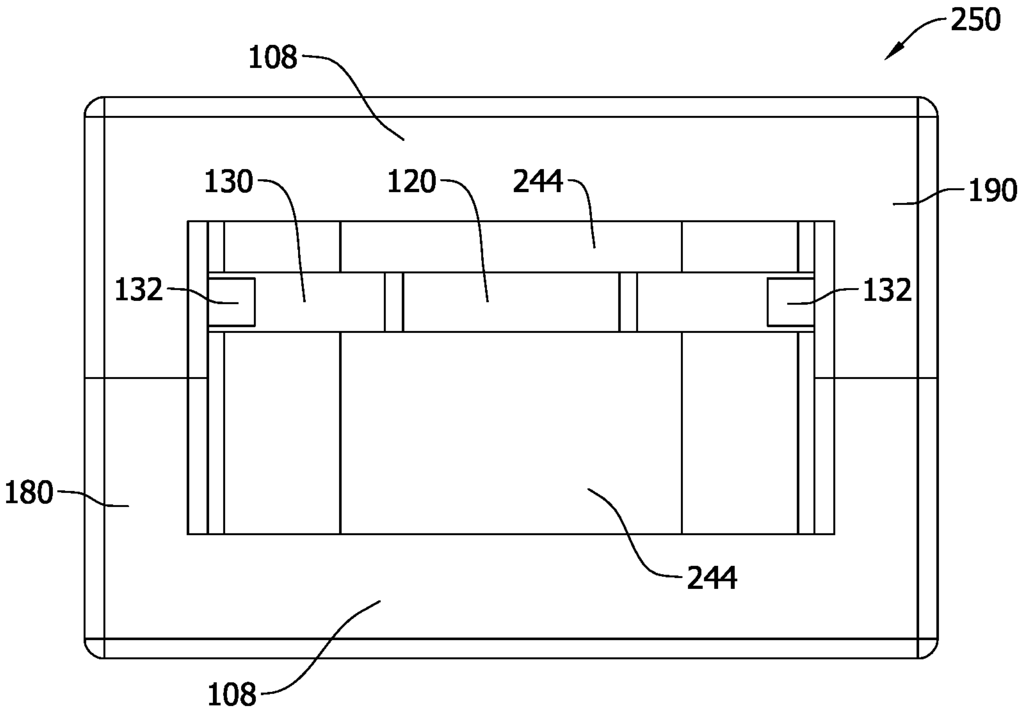
FIG. 14 is a top view of a fifth exemplary embodiment of a surface mount, electromagnetic component assembly including a plurality of magnetically coupled windings

FIG. 14 is a top view of a fifth exemplary embodiment of a surface mount electromagnetic component assembly 250 including a plurality of magnetically coupled windings that may be used in addition to or in lieu of the components 100, 200, 210 and 230 described above on the circuit board 50. The component 250 includes a core piece 180, a core piece 190 and the dual-winding arrangement 240. The windings 242, 244 are held in place by the separator columns 132 in the core piece 190.

Figure 15:
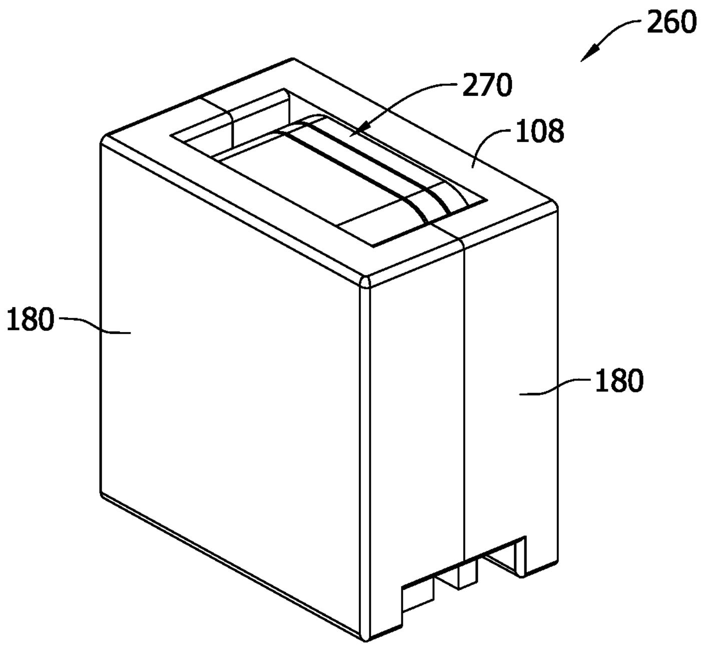
FIG. 15 is a top perspective view of a sixth exemplary embodiment of a surface mount, electromagnetic component assembly including a plurality of magnetically coupled windings.
Figure 16:
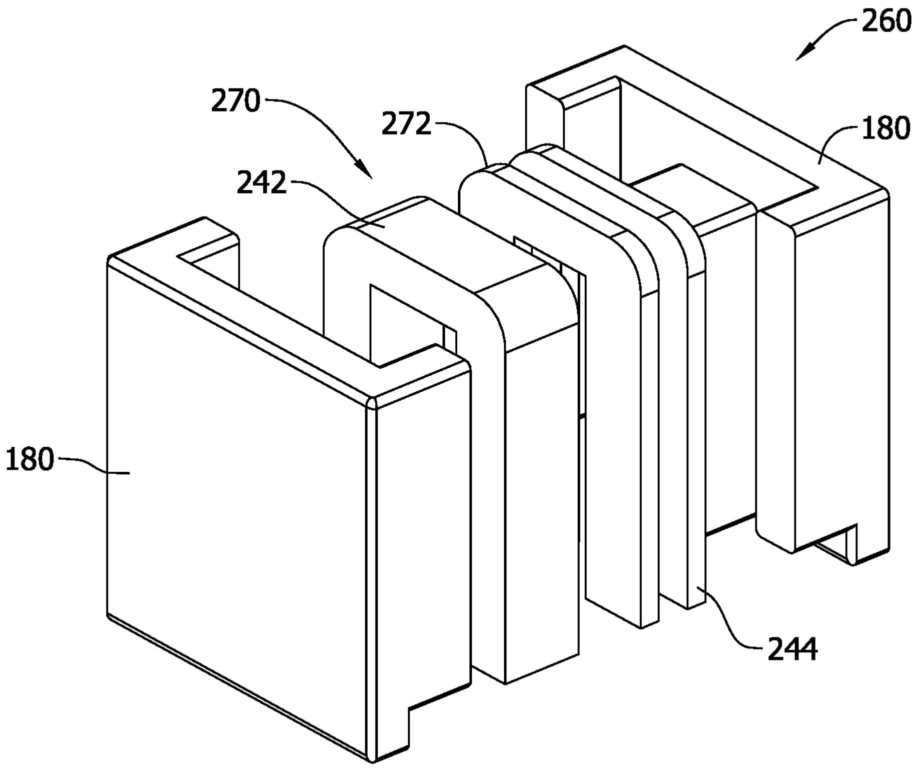
FIG. 16 is an exploded view of the electromagnetic component assembly shown in FIG. 15.
Figure 17:
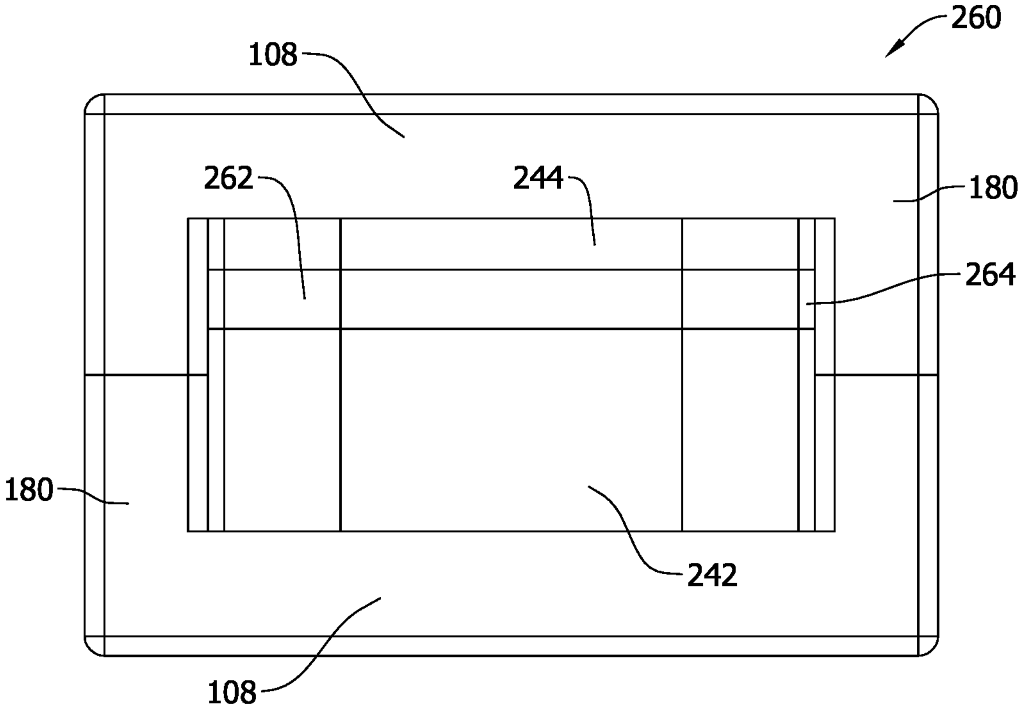
FIG. 17 is a top view of the component shown in FIGS. 15 and 16.

FIG. 15-17 are various views of a sixth exemplary embodiment of a surface mount electromagnetic component assembly 260 including a plurality of magnetically coupled windings that may be used in addition to or in lieu of the components 100, 200, 210, 230 and 250 described above on the circuit board 50. The component 260 generally includes a magnetic core structure 102 assembled from first and second magnetic core pieces 180 with a space saving dual-winding arrangement 270 arranged therebetween.

The dual-winding arrangement 270 includes windings 242, 244 with a separator element 272 therebetween. The separator element 272 may be fabricated from a magnetic or non-magnetic material to achieve the desired amount of magnetic coupling between the windings 242 and 244. The separator element 272 is formed in an inverted U-shape to match the U-shapes of the windings 242, 244 and is received in the slots in the magnetic core pieces 180 with the windings 242, 244. As shown in FIG. 17, the separator element 272 secures the windings in place in the completed component 260. Optionally, air gaps 224 may be provided on each end of the separator element 272 for enhanced operation of the component 210.

Figure 18:
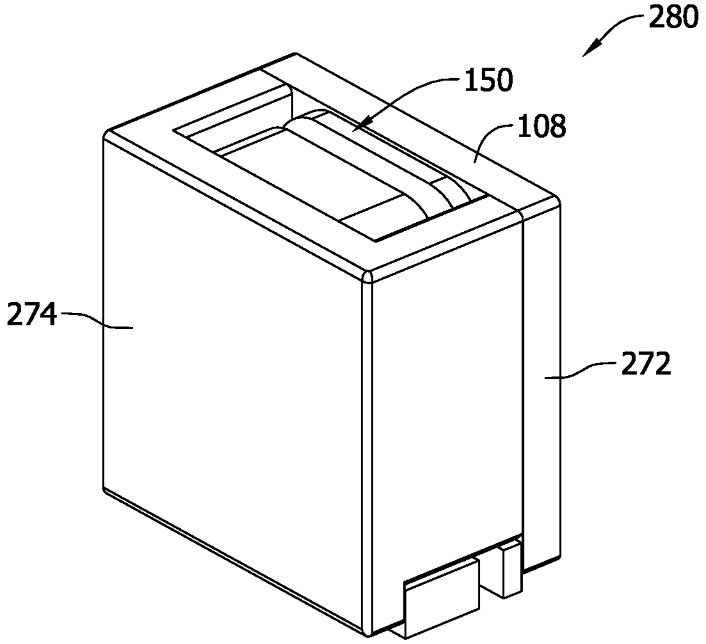
FIG. 18 is a top perspective view of an seventh exemplary embodiment of a surface mount, electromagnetic component assembly including a plurality of magnetically coupled windings.
Figure 19:
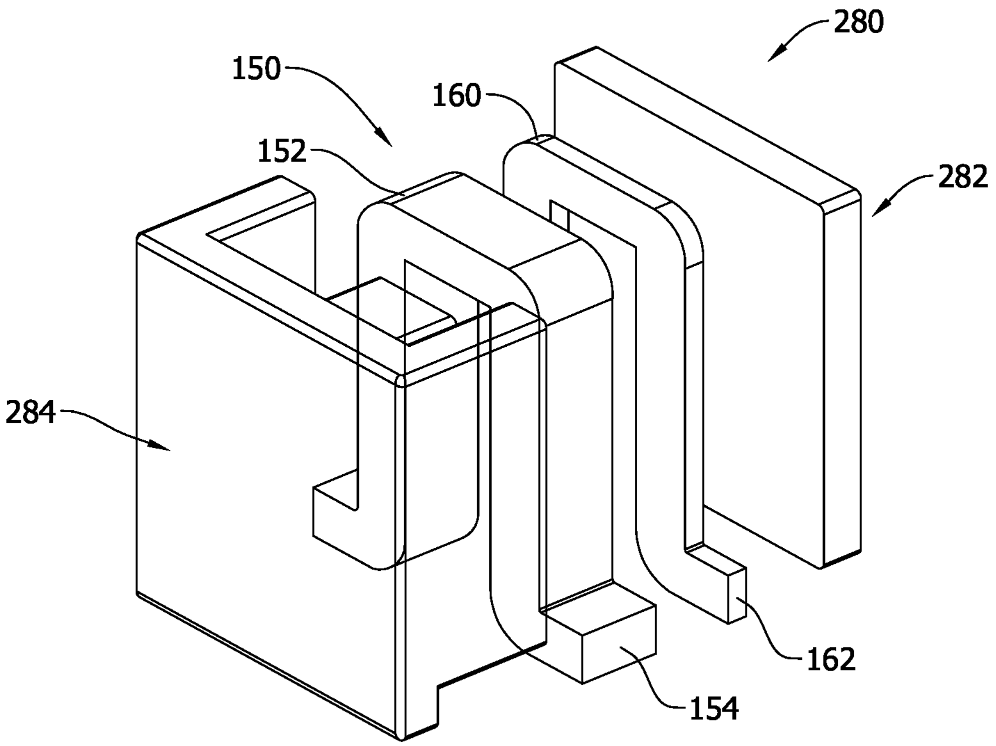
FIG. 19 is an exploded view of the electromagnetic component assembly shown in FIG. 18.

FIGS. 18 and 19 are various views of a seventh exemplary embodiment of a surface mount electromagnetic component assembly 280 including a plurality of magnetically coupled windings that may be used in addition to or in lieu of the components 100, 200, 210, 230, 250 and 260 described above on the circuit board 50. The component 280 generally includes a magnetic core structure 102 assembled from first and second modular magnetic core pieces 282, 284 with a space saving dual-winding arrangement 150 arranged therebetween.

The core piece 282 is a simply shaped flat or planar core element formed as a rectangle having dimensions L and H (FIG. 1). The core piece 284 is similar to the core piece 180 (FIG. 3) but includes longer side walls 116, 118 and internal guide element 120. The windings 152, 160 are located on the guide element 120 and are spaced from one another with an air gap in between. The core piece 282 closes the open end of the core piece 284.

Figure 20:
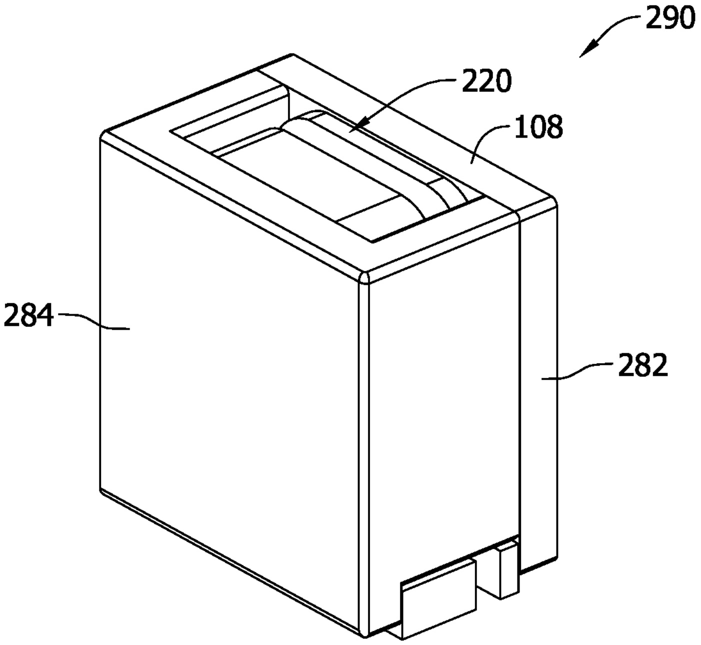
FIG. 20 is a top perspective view of an eighth exemplary embodiment of a surface mount, electromagnetic component assembly including a plurality of magnetically coupled windings.
Figure 21:
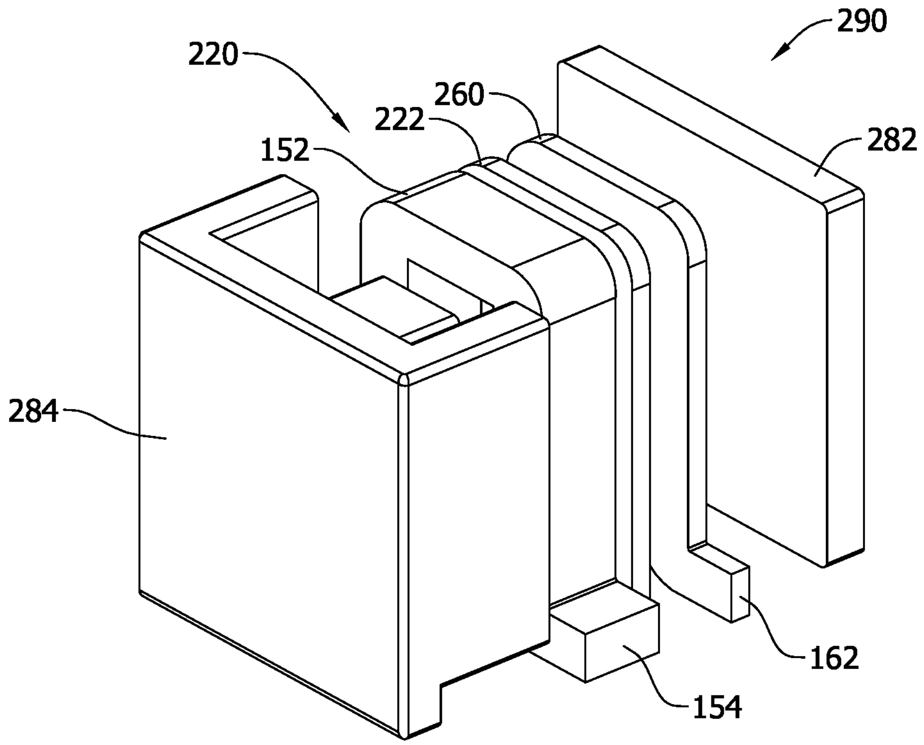
FIG. 21 is an exploded view of the electromagnetic component assembly shown in FIG. 19.
Figure 22:
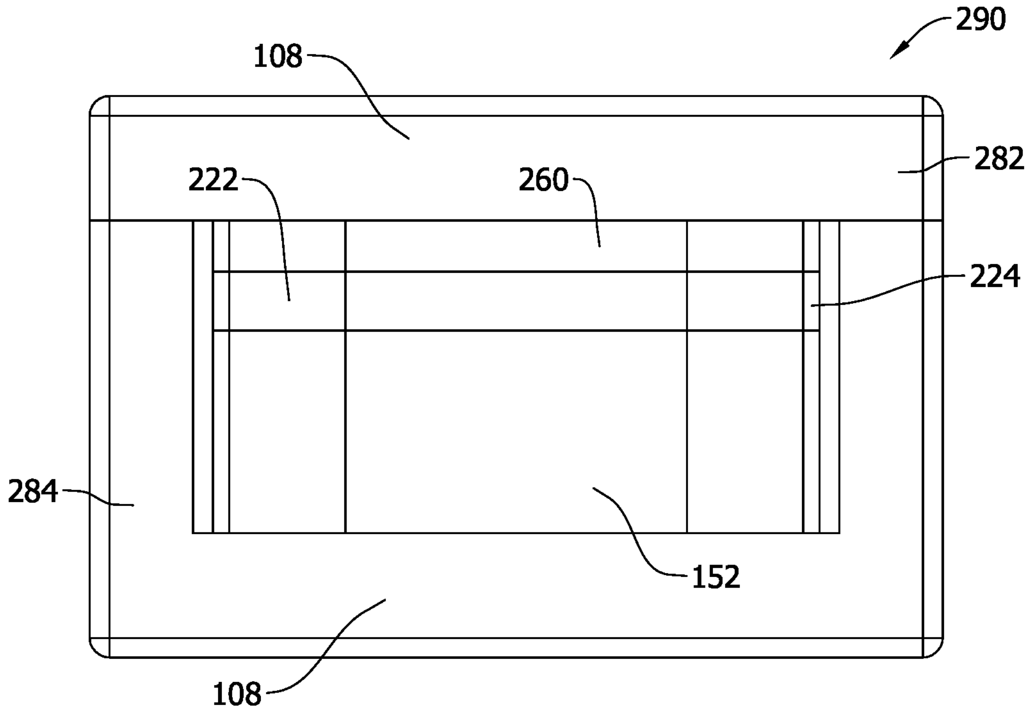
FIG. 22 is a top perspective view of the electromagnetic component assembly shown in FIGS. 19 and 20.

FIGS. 20-22 are various views of a eighth exemplary embodiment of a surface mount electromagnetic component assembly 290 including a plurality of magnetically coupled windings that may be used in addition to or in lieu of the components 100, 200, 210, 230, 250, 260 and 280 described above on the circuit board 50. The component 290 generally includes a magnetic core structure 102 assembled from first and second magnetic core pieces 282, 284 with a space saving dual-winding arrangement 220 arranged therebetween.

Figure 23:
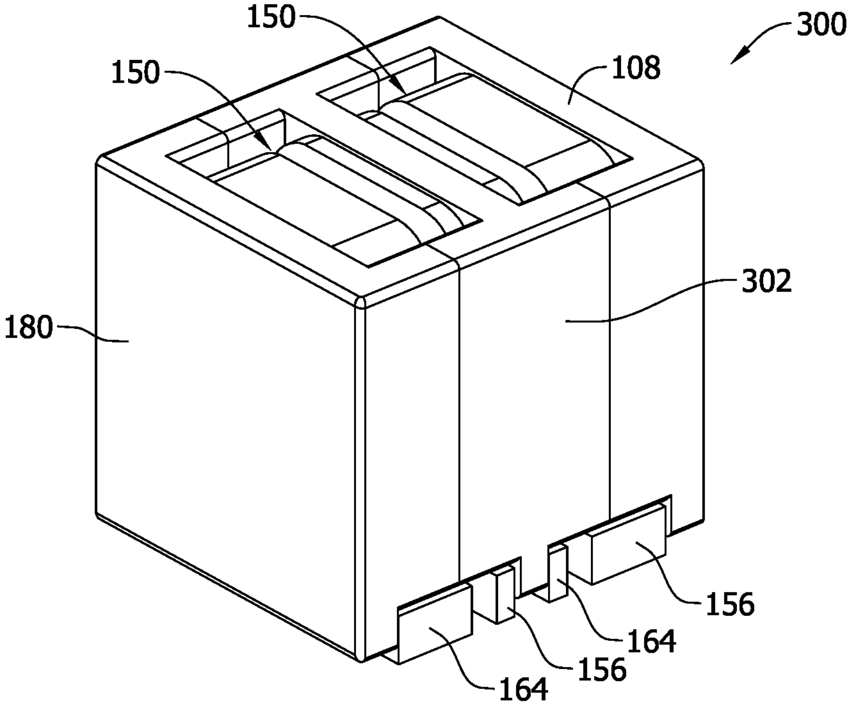
FIG. 23 is a top perspective view of a ninth exemplary embodiment of a surface mount, electromagnetic component assembly including a plurality of magnetically coupled windings.
Figure 24:
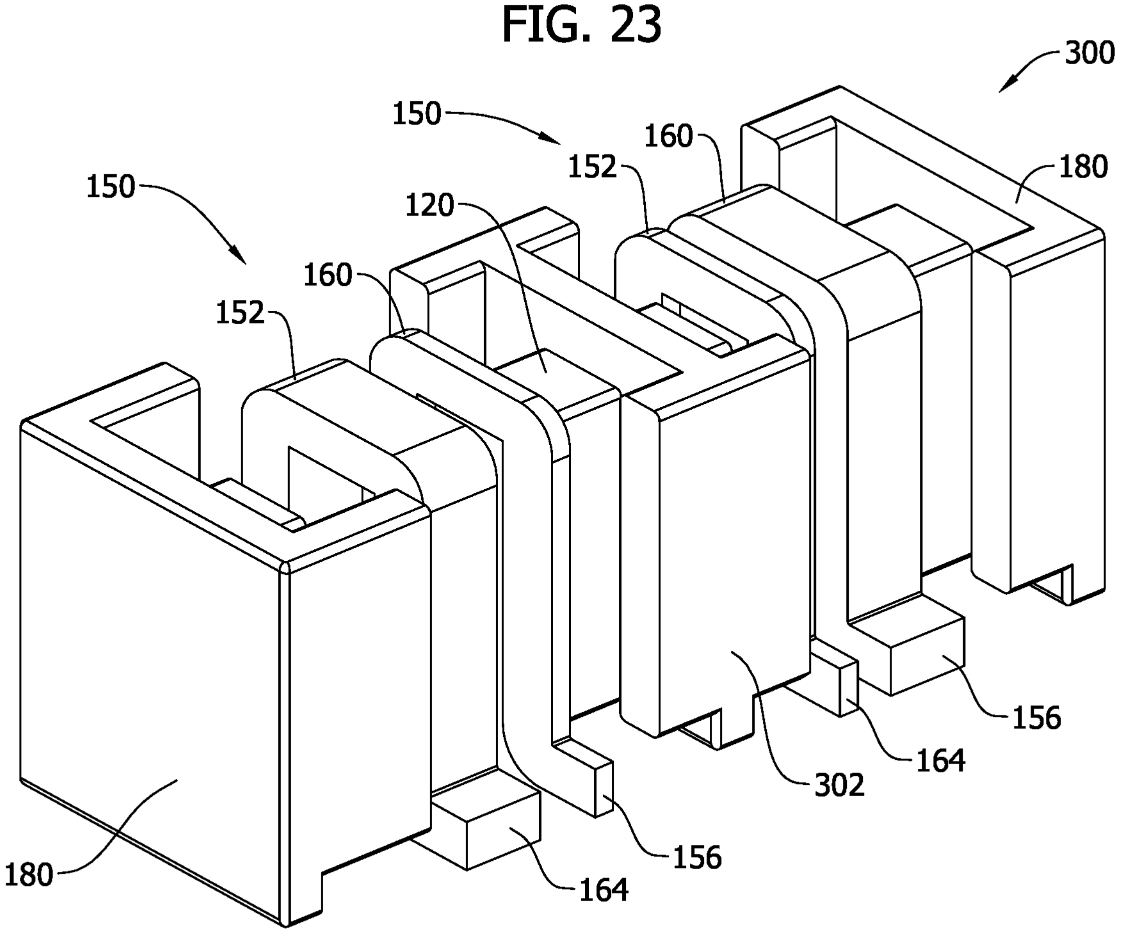
FIG. 24 is an exploded view of the electromagnetic component assembly shown in FIG. 22.

FIGS. 23 and 24 are various views of a ninth exemplary embodiment of a surface mount, electromagnetic component assembly 300 including a plurality of magnetically coupled windings that may be used in addition to or in lieu of the components 100, 200, 210, 230, 250, 260, 280 and 290 described above on the circuit board 50. The component 300 includes a magnetic core structure defined by a pair of opposing magnetic core pieces 180 with modular magnetic core piece 302 in between. A pair of dual-winding arrangements 150 is also included, with one winding arrangement on each side of the core piece 192.

The core piece 302 in the example shown includes on each opposing surface a guide element 120 and slots 122, 124, 126 similar to the magnetic core pieces 180. The windings 160 in each pair of the dual-winding arrangements 150 are received on the guide elements 120 on each opposing side of the core piece 302. The pair of dual-winding arrangements 150 may be connected to different phases of electrical power on the circuit board 50. Compared to the preceding embodiments including two magnetic core pieces and one dual-winding arrangement, the component 300 includes a pair of dual-winding arrangements 150 and three magnetic core pieces. The relatively simple shape of the modular magnetic core pieces and winding arrangements may still be provided in an economical manner.

Figure 25:
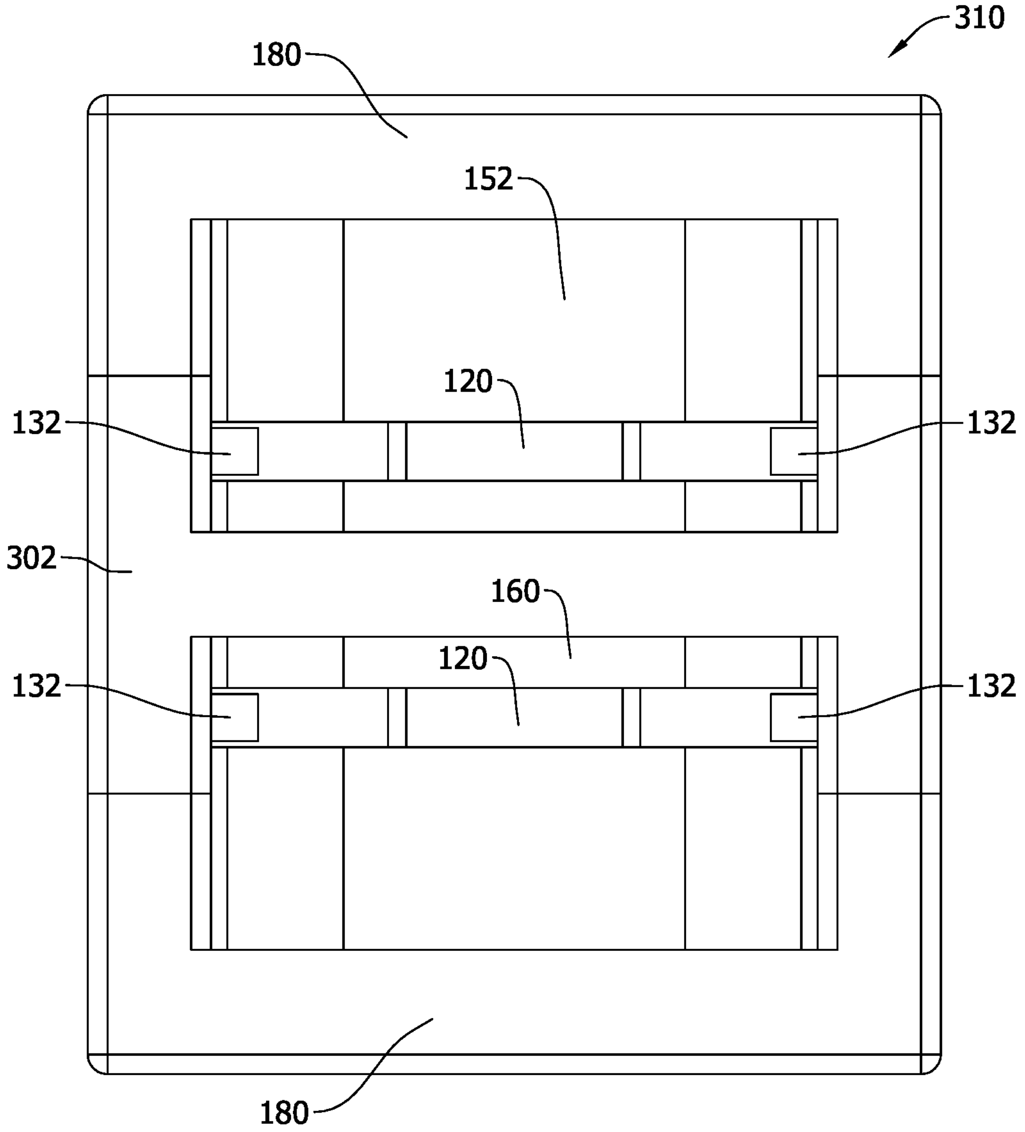
FIG. 25 is a top view of a tenth exemplary embodiment of a surface mount, electromagnetic component assembly including a plurality of magnetically coupled windings.

FIG. 25 is a top view of a tenth exemplary embodiment of a surface mount, electromagnetic component assembly 310 including a plurality of magnetically coupled windings that may be used in addition to or in lieu of the components 100, 200, 210, 230, 250, 260, 280, 290 and 300 described above on the circuit board 50. The component 310 includes a magnetic core structure defined by a pair of opposing magnetic core pieces 180 with modular magnetic core piece 312 in between. A pair of dual-winding arrangements 150 is also included, with one winding arrangement on each side of the core piece 312. The core piece 312 is similar to the core piece 192 but includes built-in separator columns 132 to obtain and maintain the desired spacing of the windings in each of the pair of dual-winding arrangements 150.

Figure 26:
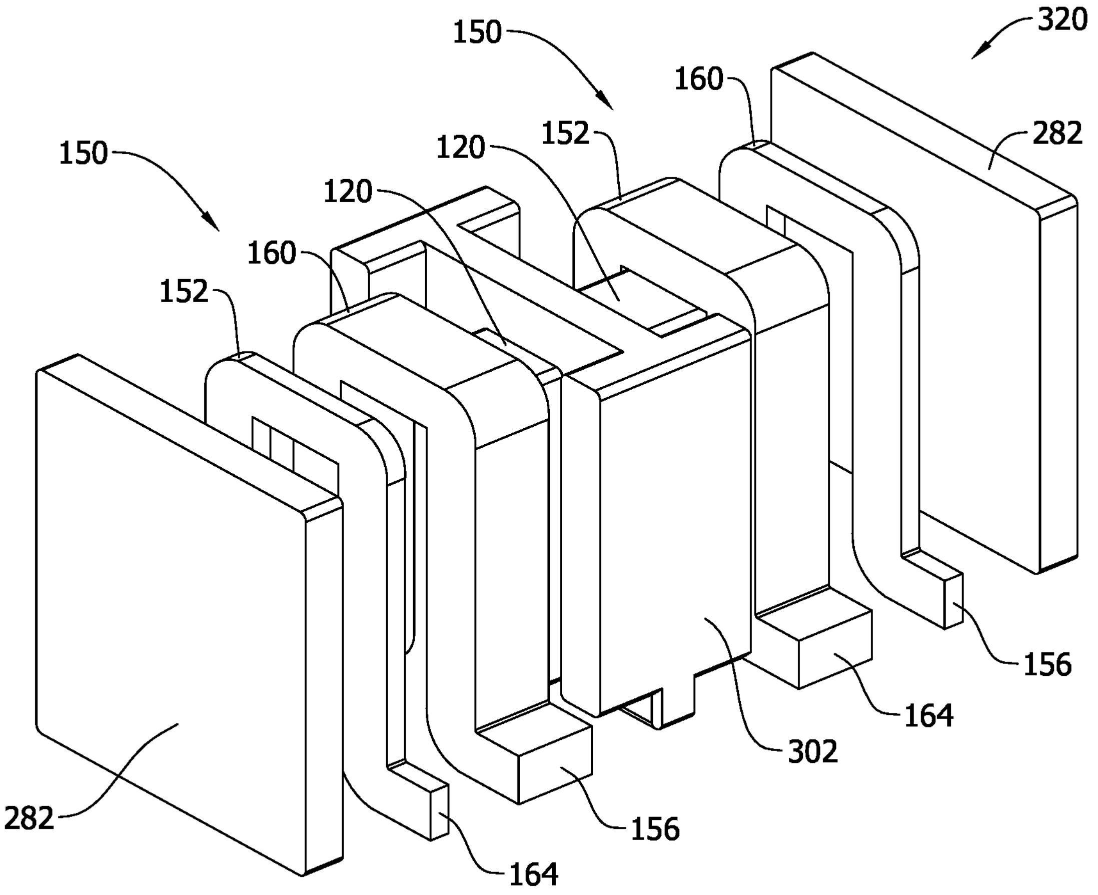
FIG. 26 is an exploded view of an eleventh exemplary embodiment of a surface mount, electromagnetic component assembly including a plurality of magnetically coupled windings.

FIG. 26 is an exploded view of an eleventh exemplary embodiment of a surface mount, electromagnetic component assembly 320 including a plurality of magnetically coupled windings that may be used in addition to or in lieu of the components 100, 200, 210, 230, 250, 260, 280, 290, 300 and 310 described above on the circuit board 50. The component 320 includes a pair of magnetic core pieces 282, a core piece 322 in between the magnetic core pieces 282, and a pair of dual-winding arrangements 150 located on either side of the magnetic core piece 302. The magnetic core piece 322 is similar to the magnetic core piece 302 but includes longer side walls to accommodate the pair of winding arrangements 150 on each opposing side. The flat magnetic core pieces 282 close the open ends of the magnetic core piece 322 and secure the windings in place.

Figure 27:
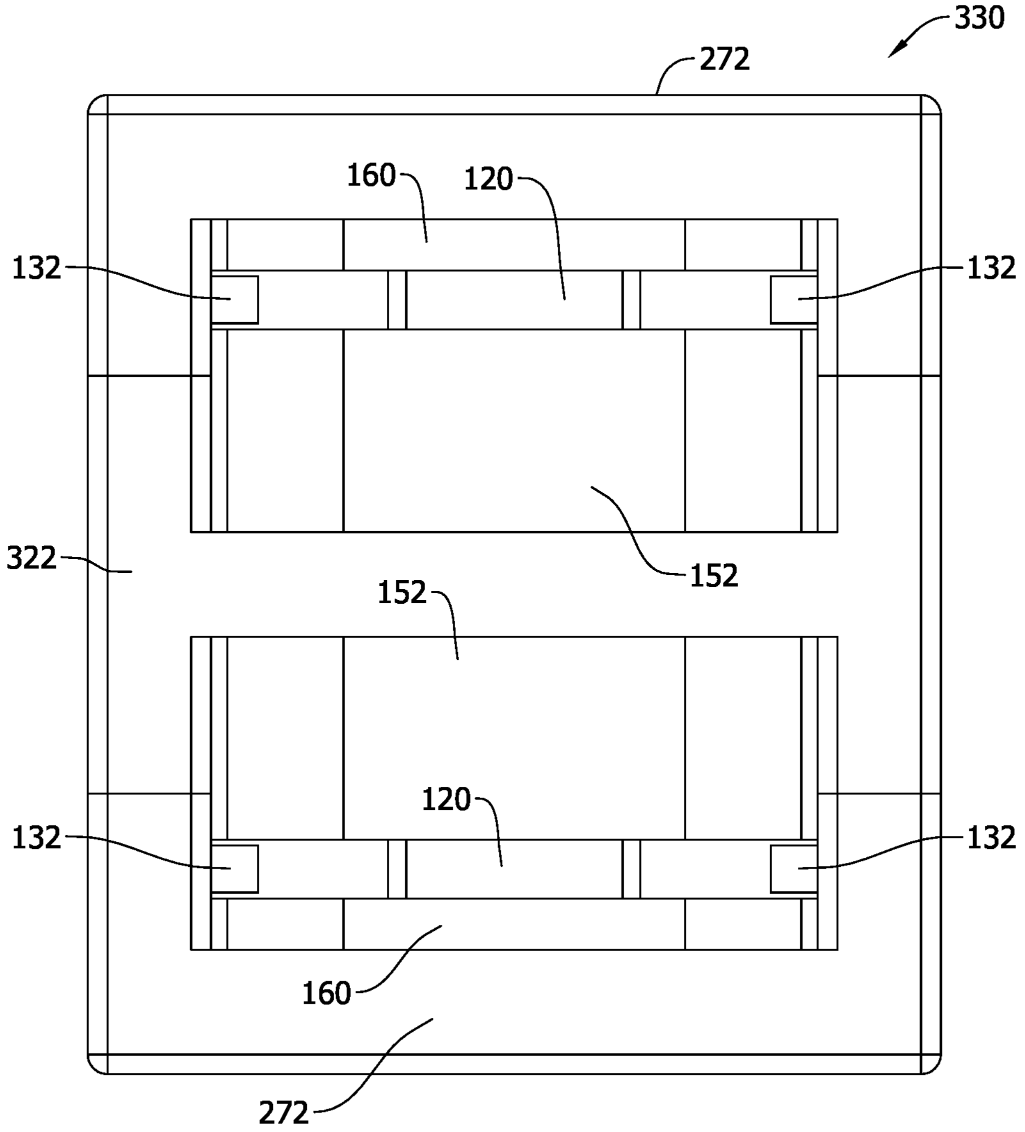
FIG. 27 is top view of a twelfth exemplary embodiment of a surface mount, electromagnetic component assembly including a plurality of magnetically coupled windings.

FIG. 27 is top view of a twelfth exemplary embodiment of a surface mount, electromagnetic component assembly 330 including a plurality of magnetically coupled windings that may be used in addition to or in lieu of the components 100, 200, 210, 230, 250, 260, 280, 290, 300, 310 and 320 described above on the circuit board 50. The component 330 includes a core piece 332 that is similar to the core piece 302 but includes built-in separator columns 132. First and second sets of windings 152 and 160 are received on each opposing side of the core piece 302, and the magnetic core pieces 282 close the open ends of the core piece 332. The separator columns obtain and maintain the desired spacing of the windings 152, 160.

Figure 28:
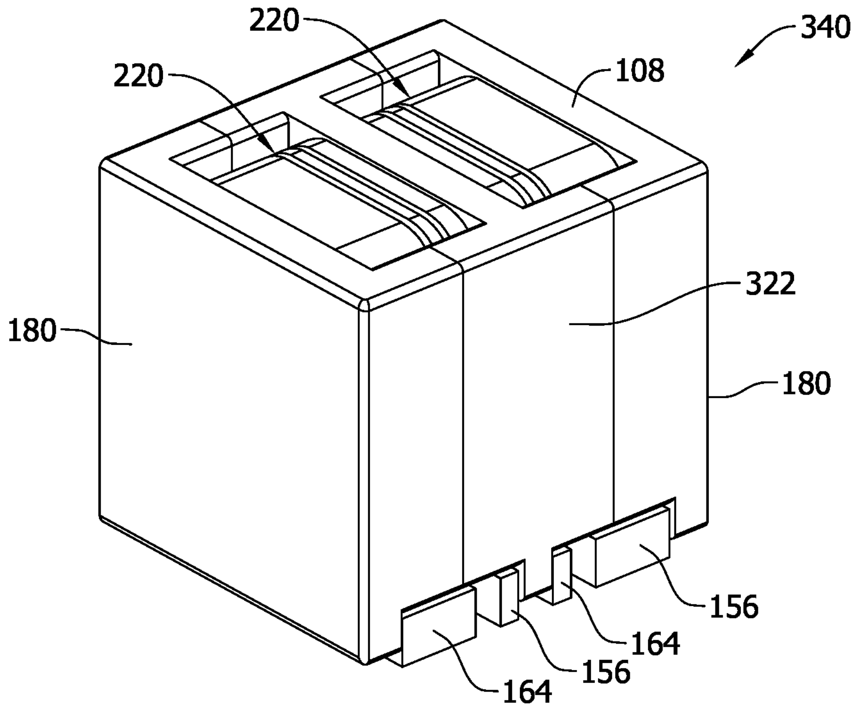
FIG. 28 is a top perspective view of a thirteenth exemplary embodiment of a surface mount, electromagnetic component assembly including a plurality of magnetically coupled windings.
Figure 29:
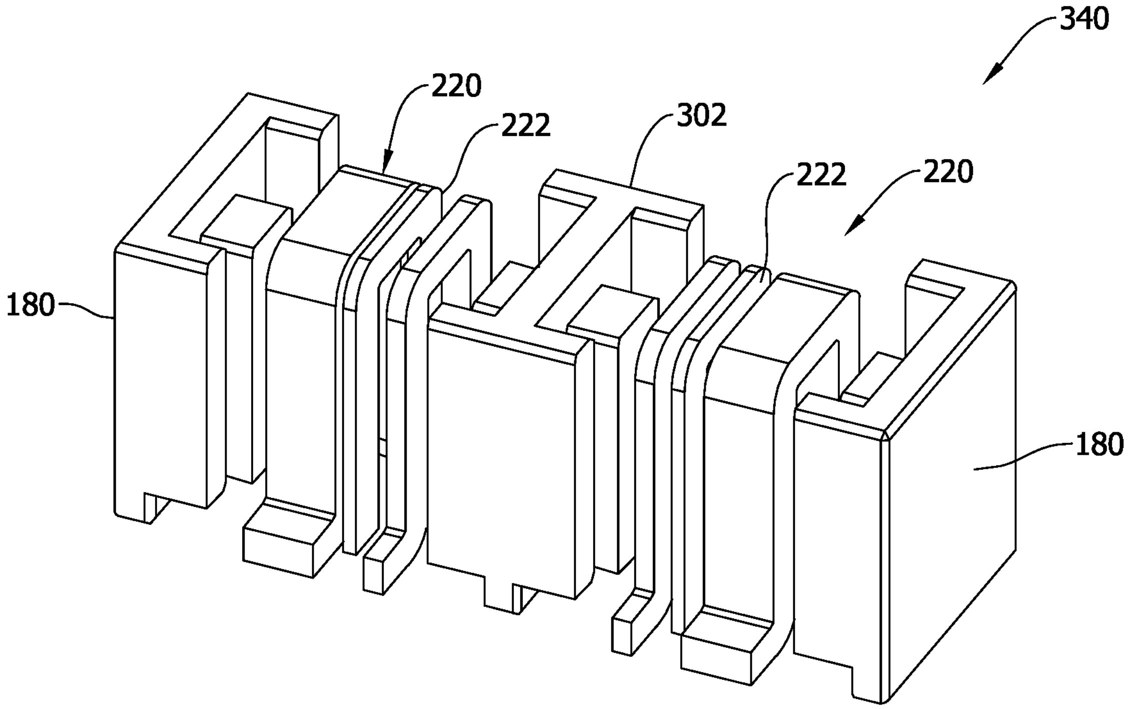
FIG. 29 is an exploded view of the electromagnetic component assembly shown in FIG. 28.

FIGS. 28 and 29 are views of a thirteenth exemplary embodiment of a surface mount, electromagnetic component assembly 340 including a plurality of magnetically coupled windings that may be used in addition to or in lieu of the components 100, 200, 210, 230, 250, 260, 280, 290, 300, 310, 320 and 330 described above on the circuit board 50. The component 340 includes a pair of magnetic core pieces 180, a core piece 302 in between the magnetic core pieces 180, and a pair of dual-winding arrangements 220 including the separator elements 222. Each dual-winding arrangement 220 is located one side of the core piece 302.

Figure 30:
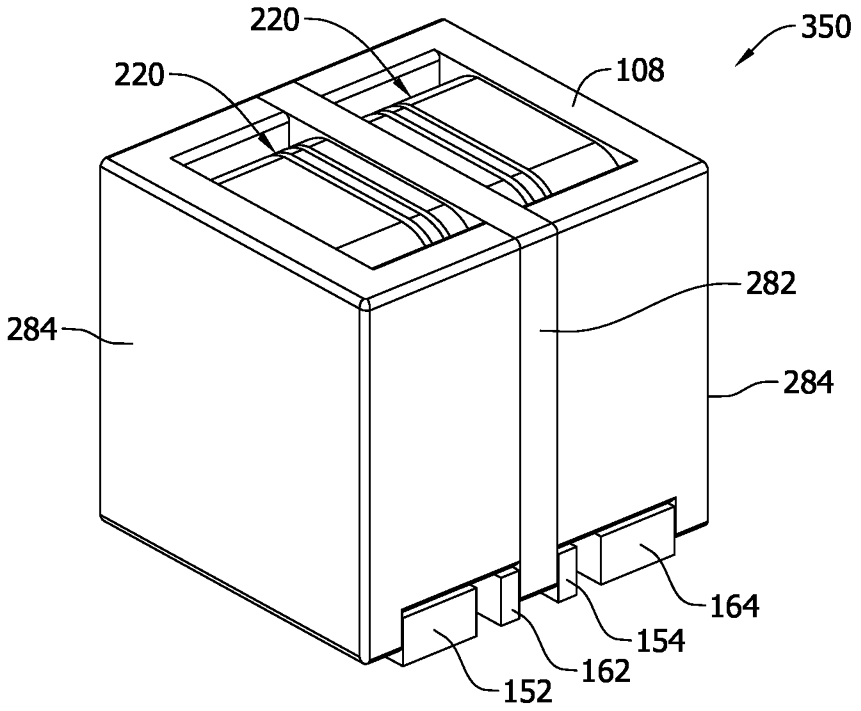
FIG. 30 is a top perspective view of a fourteenth exemplary embodiment of a surface mount, electromagnetic component assembly including a plurality of magnetically coupled windings.
Figure 31:
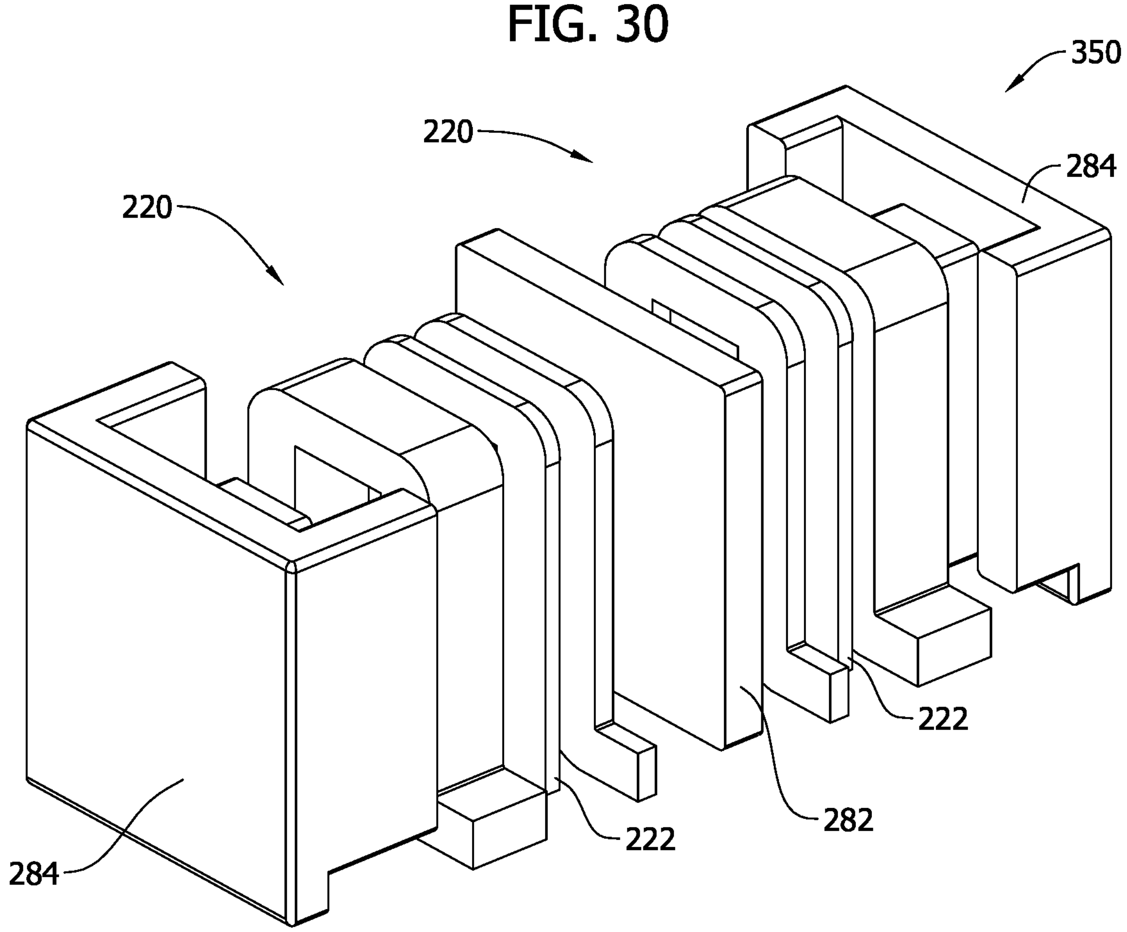
FIG. 31 is an exploded view of the electromagnetic component assembly shown in FIG. 30.

FIGS. 30 and 31 are views of a fourteenth exemplary embodiment of a surface mount, electromagnetic component assembly 350 including a plurality of magnetically coupled windings that may be used in addition to or in lieu of the components 100, 200, 210, 230, 250, 260, 280, 290, 300, 310, 320, 330 and 340 described above on the circuit board 50. The component 350 includes a pair of magnetic core pieces 284, a core piece 282 in between the magnetic core pieces 284, and a pair of dual-winding arrangements 220 including the separator elements 222. Each dual-winding arrangement 220 is located one side of the core piece 282.

Figure 32:
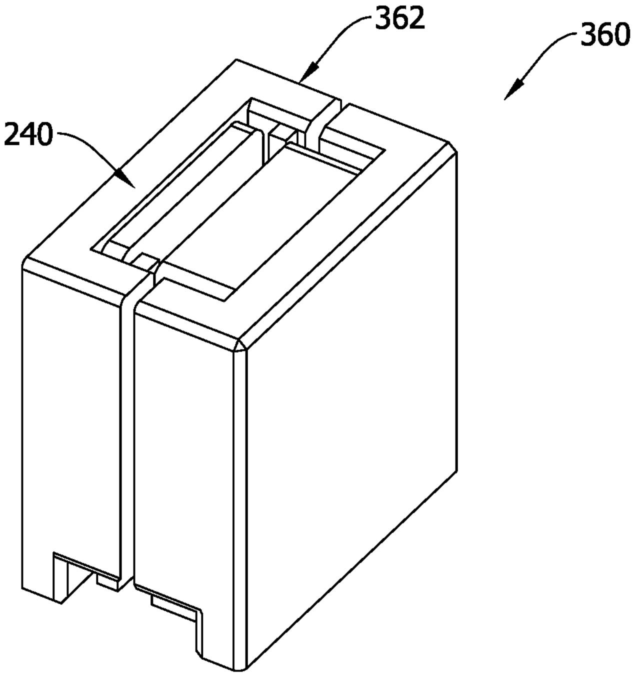
FIG. 32 is a top perspective view of a fifteenth exemplary embodiment of a surface mount, electromagnetic component assembly including a plurality of magnetically coupled windings.
Figure 33:
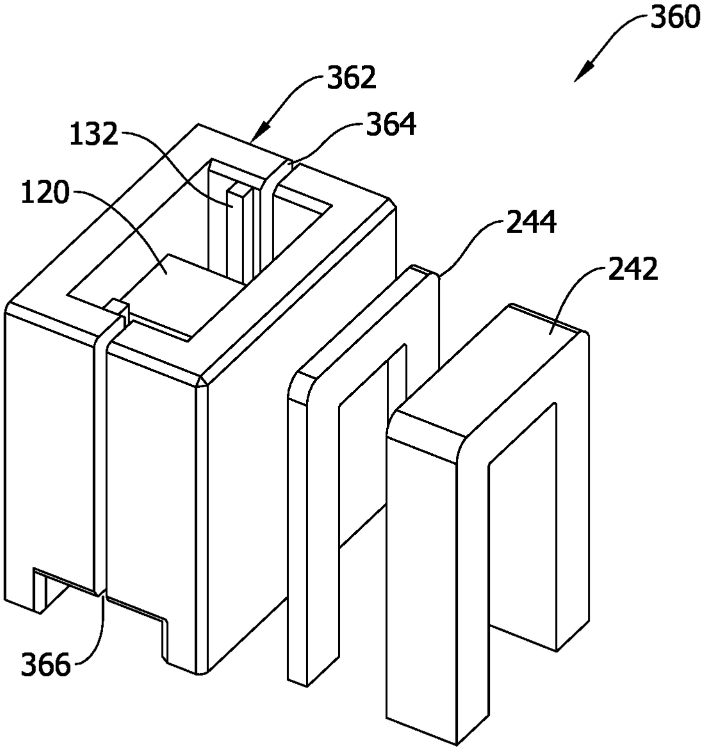
FIG. 33 is an exploded view of the electromagnetic component assembly shown in FIG. 32.
Figure 34:
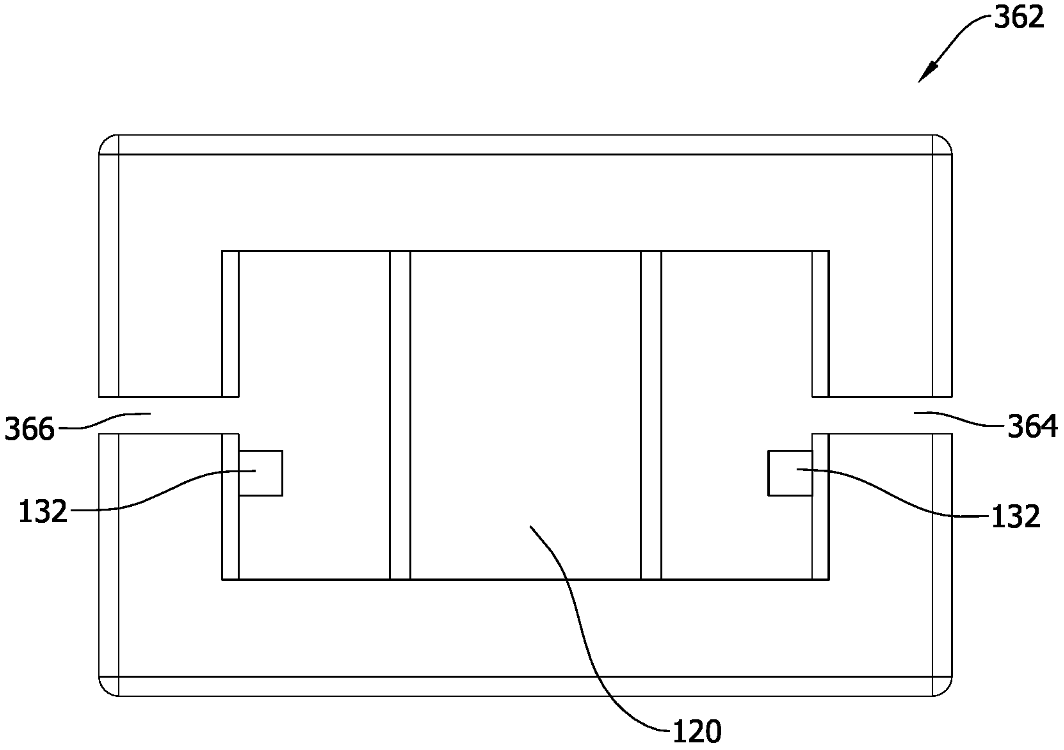
FIG. 34 is a top view of a first exemplary magnetic core piece for the component shown in FIGS. 32 and 33.

FIGS. 32 through 34 are views of a fifteenth exemplary embodiment of a surface mount, electromagnetic component assembly 360 including a plurality of magnetically coupled windings that may be used in addition to or in lieu of the components 100, 200, 210, 230, 250, 260, 280, 290, 300, 310, 320, 330, 340 and 350 described above on the circuit board 50.

Unlike the previous embodiments, the component 360 includes a single piece magnetic core structure 362 and the dual winding arrangement 240 contained therein. As such, instead of assembling more than one modular magnetic core pieces around the winding arrangement 240, in the component 360 the winding arrangement is inserted through the top opening in only one magnetic core piece 362 that is formed and fabricated with the integral features shown, but with otherwise similar in effect to a component having more than one magnetic core piece. The single piece magnetic core structure 362 features the guide element 120 receiving the inverted U-shaped main winding portion of the windings 242, 244 and separator columns 132 maintaining the desired spacing of the windings 242, 244. Additionally, the magnetic core piece 362 features centered, vertically extending physical gaps 364, 366 along the z axis of the component 360 on the respective lateral side walls 116, 118 with width W in the core structure 362. The physical gaps 364, 366 provide desired magnetic effects in the operation of the component 360.

Figure 35:
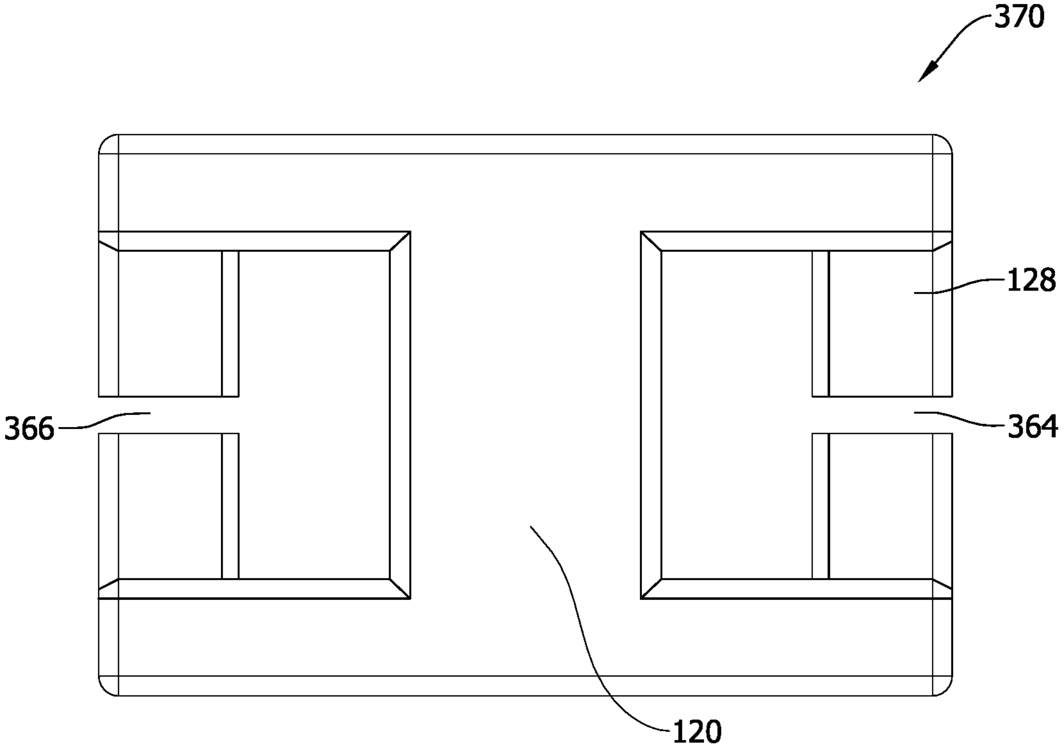
FIG. 35 is a bottom view of a second exemplary magnetic core piece for the component shown in FIGS. 32 and 33.

FIG. 35 is a bottom view of an alternative single piece magnetic core structure 370 that can be used to construct a component similar to the component 260. The core structure 370 is similar to the core structure 362 but does not include the separator columns 132.

Figure 36:
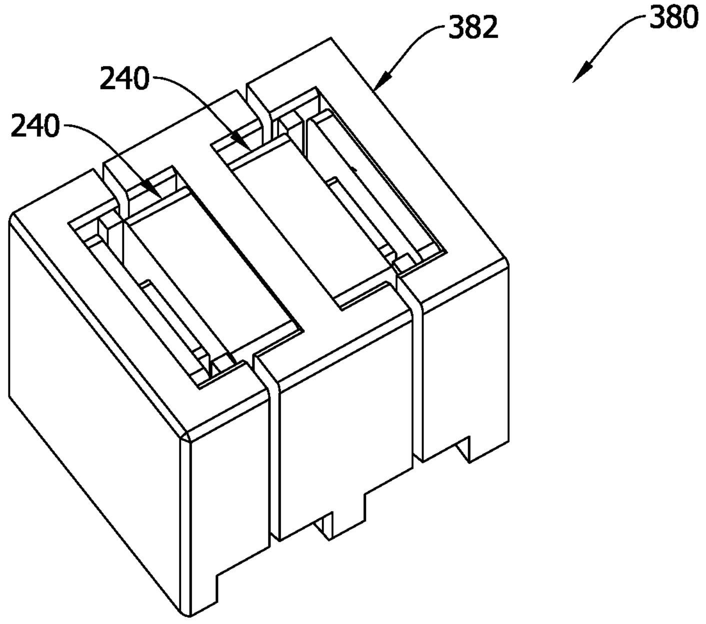
FIG. 36 is a top perspective view of a sixteenth exemplary embodiment of a surface mount, electromagnetic component assembly including a plurality of magnetically coupled windings.
Figure 37:
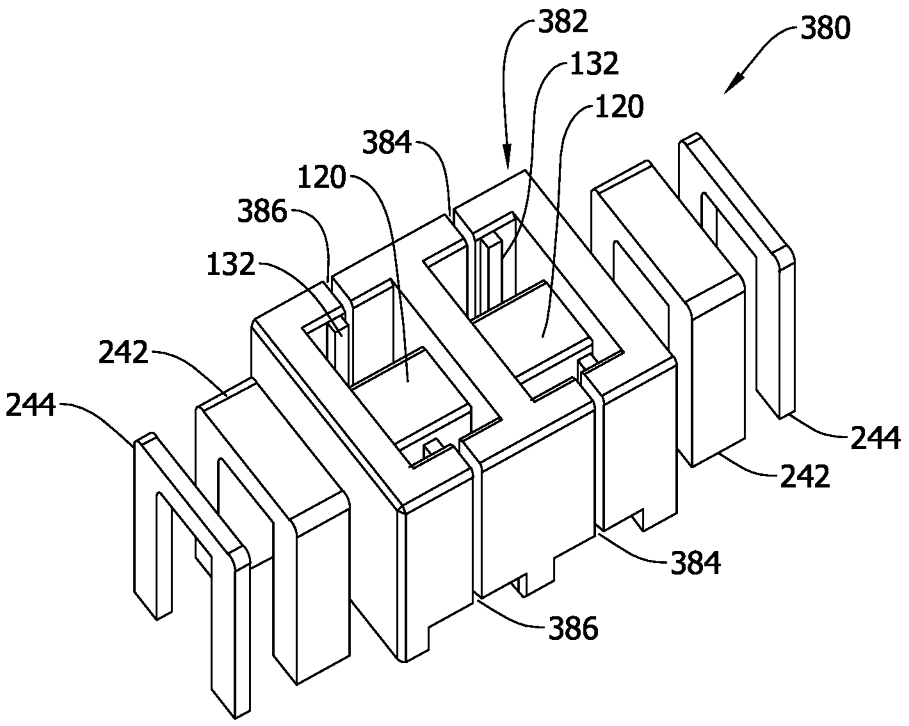
FIG. 37 is an exploded view of the electromagnetic component assembly shown in FIG. 36.

FIGS. 36 and 37 are views of a sixteenth exemplary embodiment of a surface mount, electromagnetic component assembly 380 including a plurality of magnetically coupled windings that may be used in addition to or in lieu of the components 100, 200, 210, 230, 250, 260, 280, 290, 300, 310, 320, 330, 340, 350 and 360 described above on the circuit board 50.

The component 380 includes a single piece magnetic core structure 382 and a pair of dual winding arrangements 240 contained therein. As such, instead of assembling multiple modular magnetic core pieces around the winding arrangements 240, in the component 380 the winding arrangements are inserted through the top openings in one and the same magnetic core piece 382 that is formed and fabricated with the features shown. The core structure 382 features a pair of guide elements 120 receiving each respective set of inverted U-shaped main winding portions in the windings 242, 244 and separator columns 132 maintaining the desired spacing of the windings 242, 244 in each set. Additionally, the magnetic core piece 382 features a pair of vertically extending physical gaps 384, 386 along the z axis of the component 360 on the longitudinal side walls 112, 114 with length L in the core structure 382. The physical gaps 384, 386 provide desired magnetic effects in the operation of the component 360.

Figure 38:
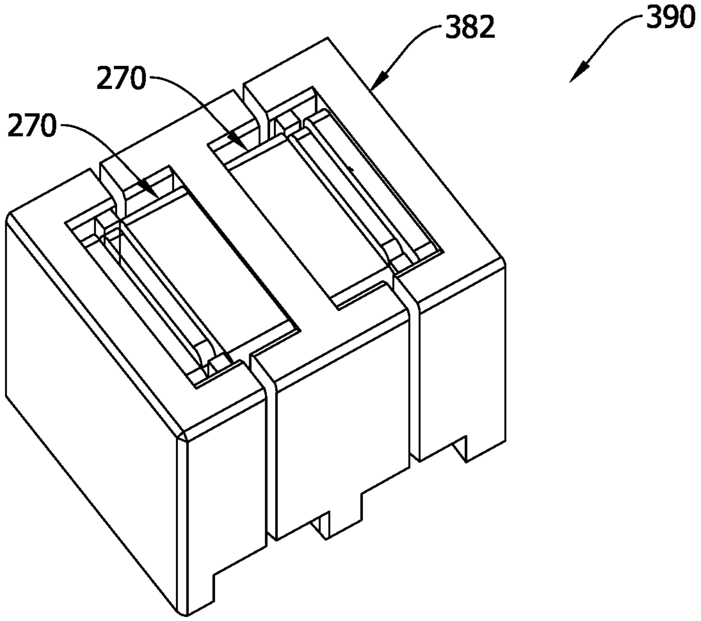
FIG. 38 is a top perspective view of a sixteenth exemplary embodiment of a surface mount, electromagnetic component assembly including a plurality of magnetically coupled windings.
Figure 39:
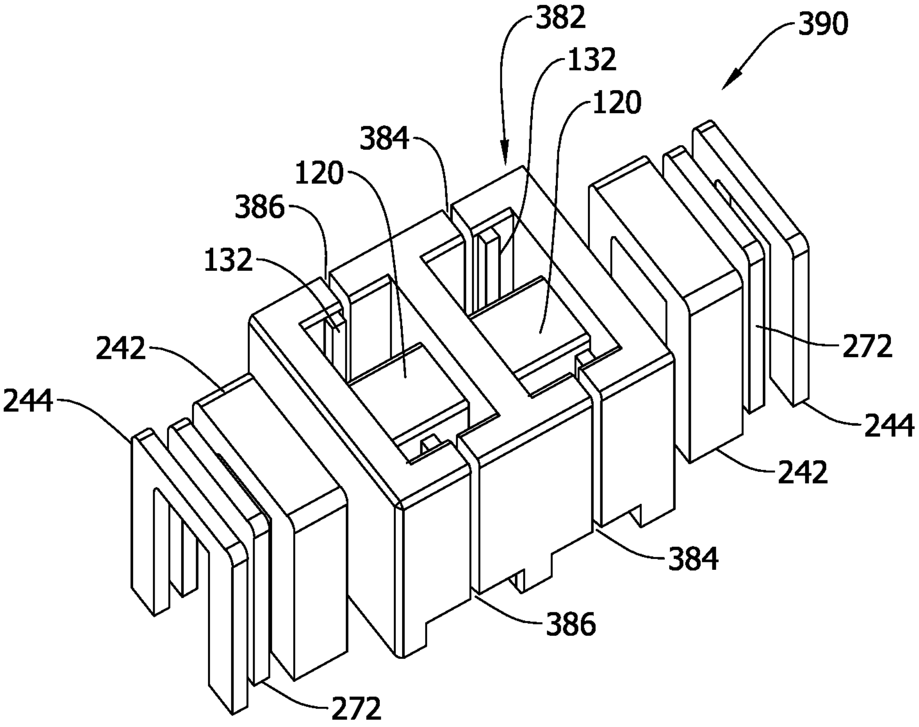
FIG. 39 is an exploded view of the electromagnetic component assembly shown in FIG. 32.

FIGS. 38 and 39 are views of a seventeenth exemplary embodiment of a surface mount, electromagnetic component assembly 390 including a plurality of magnetically coupled windings that may be used in addition to or in lieu of the components 100, 200, 210, 230, 250, 260, 280, 290, 300, 310, 320, 330, 340, 350, 360 and 380 described above on the circuit board 50.

The component 390 includes a single piece magnetic core structure 382 and a pair of dual winding arrangements 270 contained therein. As such, instead of assembling multiple modular magnetic core pieces around the winding arrangements 270, in the component 390 the winding arrangements are inserted through the top openings in one and the same magnetic core piece 382 that is formed and fabricated with the features shown.

Figure 40:
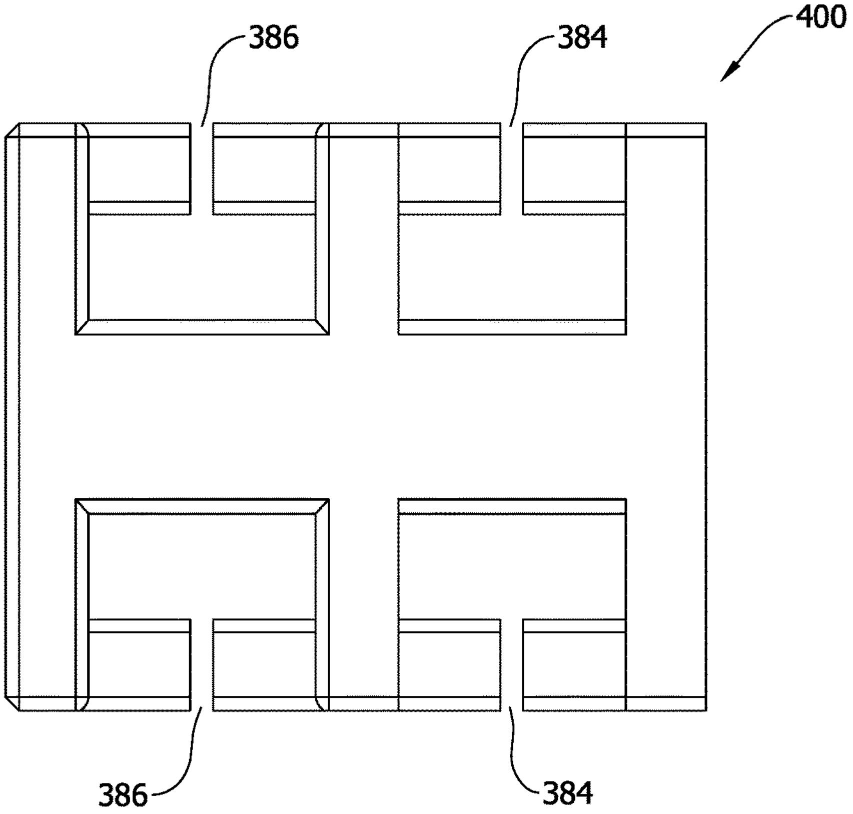
FIG. 40 is a top view of an exemplary magnetic core piece for the component shown in FIGS. 38 and 39.

FIG. 40 is a bottom view of an alternative single piece magnetic core structure 400 that can be used to construct a component similar to the component 380. The core structure 400 is similar to the core structure 382 but does not include the separator columns 132.

Figure 41:
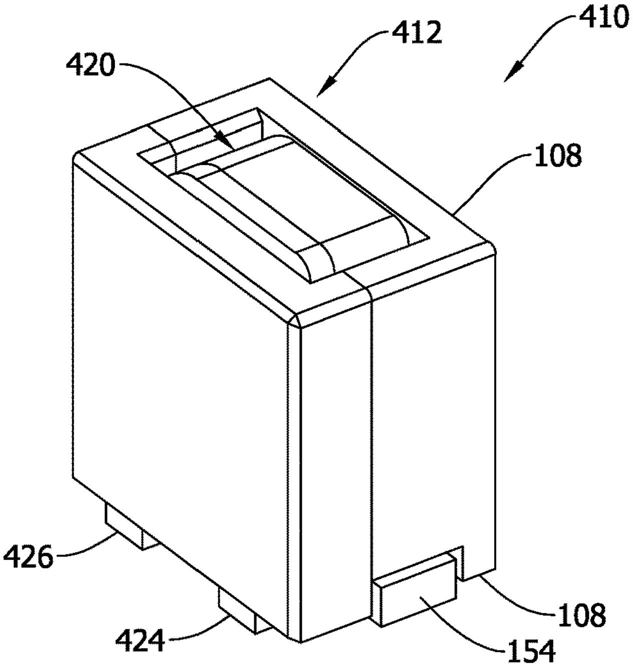
FIG. 41 is a top perspective view of a seventeenth exemplary embodiment of a surface mount, electromagnetic component assembly including a plurality of magnetically coupled windings.
Figure 42:
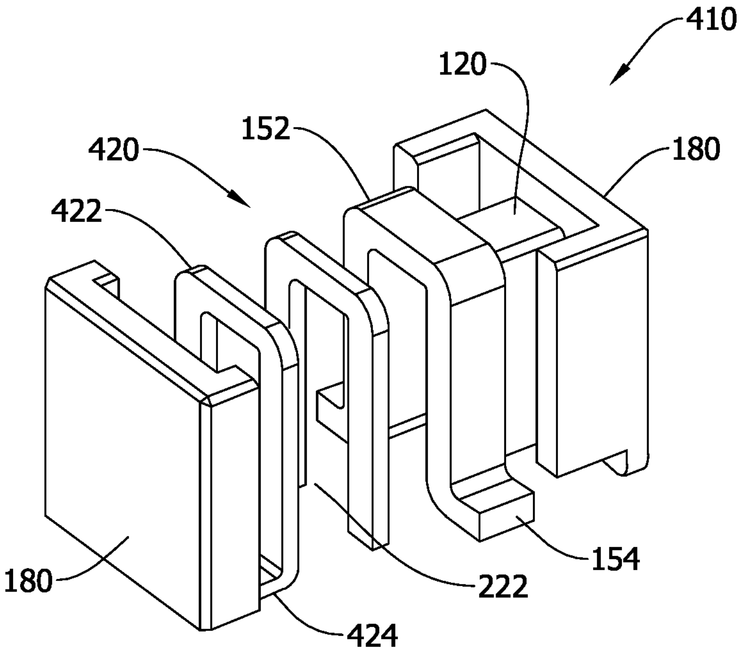
FIG. 42 is a top exploded view of the component shown in FIG. 41.
Figure 43:
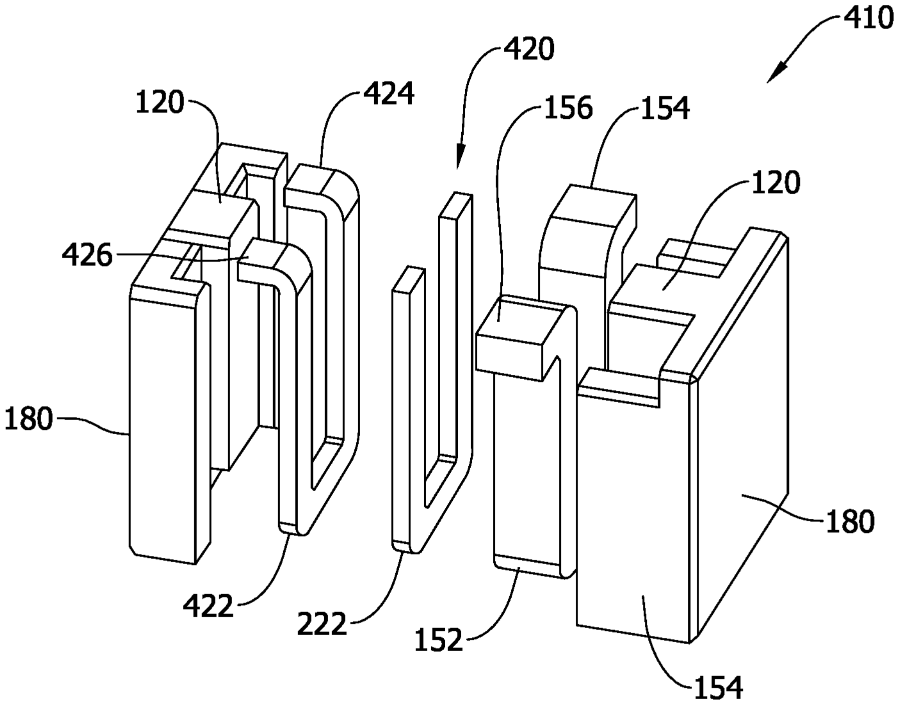
FIG. 43 is a bottom exploded view of the component shown in FIG. 41.

FIGS. 41-43 are views of a seventeenth exemplary embodiment of a surface mount electromagnetic component assembly 410 including a plurality of magnetically coupled windings that may be used in addition to or in lieu of the components 100, 200, 210, 230, 250, 260, 280, 290, 300, 310, 320, 330, 340, 350, 360, 380 and 390 described above on the circuit board 50. The component 410 generally includes a magnetic core structure 412 assembled from first and second magnetic core pieces 180 with a space saving dual-winding arrangement 420 arranged therebetween. Unlike the embodiments described above include evenly proportioned magnetic core pieces 180 defining ½ of the magnetic core structure 412, the core pieces 180 are similarly shaped but differently proportioned such that one of the core pieces 180 defines about ⅔ of the magnetic core structure 412 while the other defines about ⅓ of the magnetic core structure 412 about the dual-winding arrangement 420.

The dual-winding arrangement 420 includes the winding 152 and a winding 422 with a separator element 222 therebetween. The winding 462 is similar to the winding 160 in its reduced thickness, co-planar inverted U-shaped main winding portion but with differently formed surface mount termination pads 424, 426 extending toward the longitudinal side wall of the core piece 180 instead of toward the lateral side wall as in the winding 160. As such, the surface mount termination pads 424, 426 in the winding 422 extend in the same plane and in the same direction toward the same side wall, instead of opposite directions toward different side walls as in the winding 160. The surface mount termination pads 154, 156 extend in a 180° orientation relative to one another, while the surface mount termination pads 424, 426 extend at a 90° angle to the surface mount termination pads 154, 156 and also 90° relative to the plane of the inverted U-shaped main winding portion of the winding 422. The bottom side of the magnetic core piece 180 receiving the winding 422 includes cut-out portions to receive the terminations 424, 426.

Figure 44:
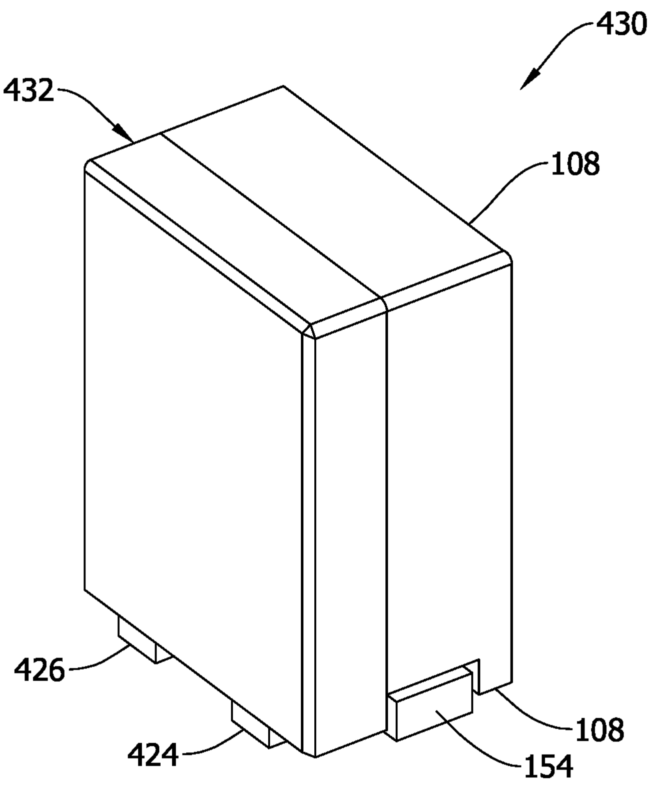
FIG. 44 is a top perspective view of an eighteenth exemplary embodiment of a surface mount, electromagnetic component assembly including a plurality of magnetically coupled windings.
Figure 45:
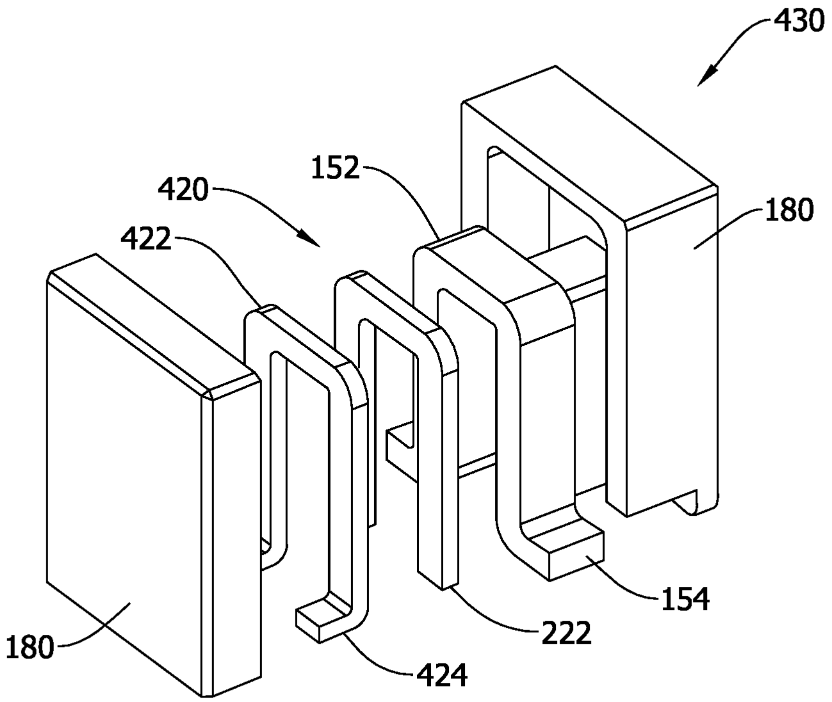
FIG. 45 is a top exploded view of the component shown in FIG. 41.
Figure 46:
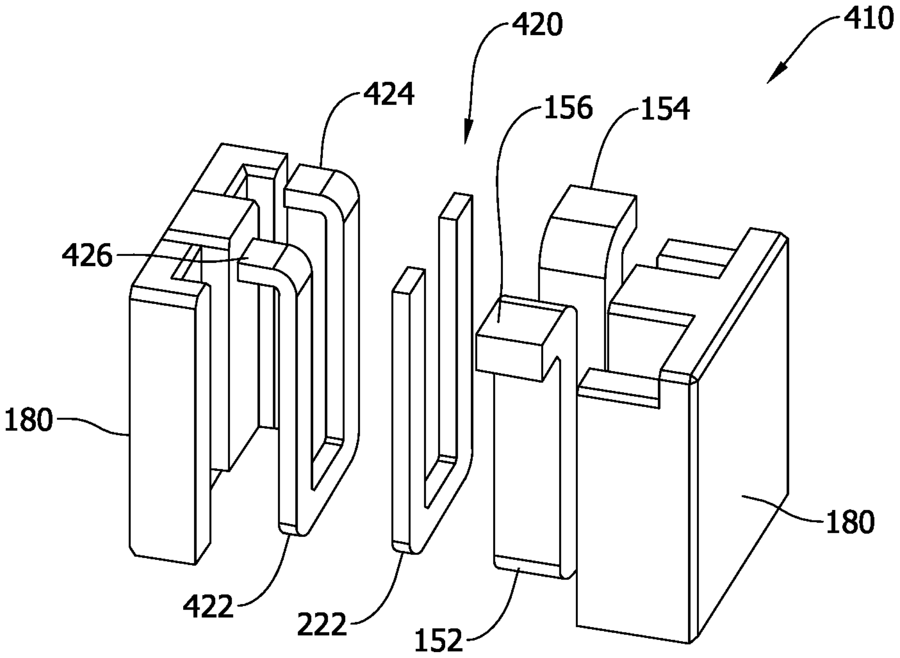
FIG. 46 is a bottom exploded view of the component shown in FIG. 41.

FIGS. 44-46 are views of a nineteenth exemplary embodiment of a surface mount electromagnetic component assembly 430 including a plurality of magnetically coupled windings that may be used in addition to or in lieu of the components 100, 200, 210, 230, 250, 260, 280, 290, 300, 310, 320, 330, 340, 350, 360, 380, 390 and 410 described above on the circuit board 50. The component 430 is similar to the component 410 but the top side wall 108 of the magnetic core structure 432 is closed and solid instead of having an opening exposing a portion of the dual-winding arrangement in the embodiments described above. As such, the core pieces 108 defining the magnetic core structure 432 do not include the openings in the top side wall and when assembled around the dual-winding arrangement 420 the main winding portions are not exposed.

While a number of different electromagnetic components have been illustrated and described that can be assembled from a relatively small number of component parts in a cost effective manner in a desired package size with acceptable performance, further variations are of course possible to include still further numbers of dual-windings to accommodate additional phases of a multi-phase power system. The magnetic core structures, magnetic core pieces and dual-winding arrangements described can be mixed and matched into a sizable variety of different components having different performance characteristics from a relatively small inventory of component parts that are economical to manufacture, amenable to automated assembly prospects. Additionally, isolation between two windings is possible for ease of assembly or to vary performance using the separator elements described, and the magnetic core structures including the cut-out portions makes it easier to inspect soldering filet on all of the terminal connections to the circuit board.

The benefits and advantages of the exemplary embodiments disclosed are now believed to have been amply illustrated in relation to the exemplary embodiments disclosed.

An embodiment of a surface mount electromagnetic component for a multi-phase electrical power circuitry implemented on a circuit board has been disclosed. The component includes a magnetic core structure having a top side, a bottom side, opposing lateral sides and opposing longitudinal sides. A dual-winding arrangement is inside the magnetic core structure and is configured to be surface mounted at the bottom side to the multi-phase electrical power circuitry on the circuit board. The dual-winding arrangement includes a first winding fabricated from an elongated conductor having a first thickness, the first winding defining a first inverted U-shaped main winding portion including out of plane axial bends transitioning between axially extending perpendicular sections of the U-shaped main winding portion; and a second winding fabricated from a conductor having a second thickness less than the first thickness, the second winding defining a second inverted U-shaped main winding portion with perpendicular sections extending co-planar to one another without any out of plane axial bends. The first inverted U-shaped main winding portion and the second inverted U-shaped main winding portion is laterally spaced from one another inside the magnetic core structure while being magnetically coupled inside the magnetic core structure.

Optionally, the magnetic core structure may have a length dimension a width dimension, and a height dimension relative to the circuit board; and the height dimension may be substantially greater than the width dimension. The second inverted U-shaped main winding portion of the second winding may extend in a plane defined by the height dimension and the length dimension. The first and second windings may also include surface mount termination pads at the bottom side of the component. The bottom side may include cut-out portions receiving the surface mount termination pads.

Also optionally, a portion of each of the first and second windings is exposed on the top side. The dual-winding arrangement may also include a separator extending between the first winding and the second winding. The separator may be separately provided from the magnetic core structure, and may have an inverted U-shape that is received in the magnetic core structure. Alternatively, the separator may be built-in to the magnetic core structure, and may include first and second columns spaced from a common wall in the magnetic core structure in an amount to receive one of the first and second windings between the separator and the common wall.

The magnetic core structure may optionally be defined by at least two modular magnetic core pieces. One of the at least two modular magnetic core pieces may define a surface formed with slots to receive corresponding portions of the first winding and the second winding in the dual-winding arrangement. The one of the at least two modular magnetic core pieces may define a first surface and a second surface opposing first surface, each of the first and second surfaces including slots to respectively receive portions of a first dual-winding arrangement on the first surface and portions of a second dual-winding arrangement on the second surface. Each of the at least two modular magnetic core pieces may likewise define a surface formed with slots to receive portions of the dual-winding arrangement. One of the at least two modular magnetic core pieces may also be a flat and planar core piece.

The magnetic core structure may alternatively be defined by a single magnetic core piece. The single magnetic core piece may include a built-in separator feature extending between the first winding and the second winding, and the single magnetic core piece may be formed with at least one physical gap.

A physical air gap may also optionally extend between a portion of the dual-winding arrangement and the magnetic core structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A surface mount electromagnetic component for multi-phase electrical power circuitry implemented on a circuit board, the component comprising:

a magnetic core structure including a top side, a bottom side, opposing lateral sides and opposing longitudinal sides; and a dual-winding arrangement inside the magnetic core structure and configured to be surface mounted at the bottom side to the multi-phase electrical power circuitry on the circuit board, wherein the dual-winding arrangement comprises:

a first winding fabricated from an elongated conductor having a first thickness, the first winding defining a first inverted U-shaped main winding portion, wherein the first inverted U-shaped main winding portion includes a first top section and first vertical legs perpendicular to the first top section, and wherein the first inverted U-shaped main winding portion further includes out of plane bends transitioning between the first top section and the first vertical legs, wherein the elongated conductor is bent in a geometry of the first inverted U-shaped main winding portion via the out of plane bends;

a second winding fabricated from a planar sheet of a conductor having a second thickness less than the first thickness, the second winding defining a second inverted U-shaped main winding portion, wherein the second inverted U-shaped main winding portion includes a second top section and second vertical legs perpendicular to the second top section, and wherein the second top section and the second vertical legs extend co-planar to one another without any out of plane bends;

wherein the first inverted U-shaped main winding portion and the second inverted U-shaped main winding portion is laterally spaced from one another inside the magnetic core structure while being magnetically coupled inside the magnetic core structure; and wherein the first winding further includes a first pair of surface mount termination pads at the bottom side of the component, wherein the second winding further include a second pair of surface mount termination pads at the bottom side of the component, wherein the first pair of surface mount termination pads extend in opposite directions to one another toward each opposing lateral side, and wherein the second pair of surface mount termination pads extend in opposite directions to one another toward each opposing lateral side.

2. The electromagnetic component of claim 1, wherein the magnetic core structure has a length dimension a width dimension, and a height dimension relative to the circuit board; and wherein the height dimension is substantially greater than the width dimension.

3. The electromagnetic component of claim 2, wherein the second inverted U-shaped main winding portion of the second winding extends in a plane defined by the height dimension and the length dimension.

4. The electromagnetic component of claim 1, wherein the surface mount termination pads in the first and second windings extend at 90° orientations relative to one another.

5. The electromagnetic component of claim 1, wherein a portion of each of the first and second windings is exposed on the top side.

6. The electromagnetic component of claim 1, wherein the dual-winding arrangement further comprises a separator extending between the first winding and the second winding.

7. The electromagnetic component of claim 6, wherein the separator is separately provided from the magnetic core structure.

8. The electromagnetic component of claim 7, wherein the separator has an inverted U-shape that is received in the magnetic core structure.

9. The electromagnetic component of claim 6, wherein the separator is built-in to the magnetic core structure.

10. The electromagnetic component of claim 9, wherein the separator comprises first and second columns spaced from a common wall in the magnetic core structure in an amount to receive one of the first and second windings between the separator and the common wall.

11. The electromagnetic component of claim 1, wherein the magnetic core structure is defined by at least two modular magnetic core pieces.

12. The electromagnetic component of claim 11, wherein one of the at least two modular magnetic core pieces defines a surface formed with slots to receive corresponding portions of the first winding and the second winding in the dual-winding arrangement.

13. The electromagnetic component of claim 12, wherein the one of the at least two modular magnetic core pieces defines a first surface and a second surface opposing first surface, each of the first and second surfaces including slots to respectively receive portions of a first dual-winding arrangement on the first surface and portions of a second dual-winding arrangement on the second surface.

14. The electromagnetic component of claim 12, wherein each of the at least two modular magnetic core pieces defines a surface formed with slots to receive portions of the dual-winding arrangement.

15. The electromagnetic component of claim 11, wherein one of the at least two modular magnetic core pieces is a flat and planar core piece.

16. The electromagnetic component of claim 1, wherein the magnetic core structure is defined by a single magnetic core piece.

17. The electromagnetic component of claim 16, wherein the single magnetic core piece includes a built-in separator feature extending between the first winding and the second winding.

18. The electromagnetic component of claim 16, wherein the single magnetic core piece is formed with at least one physical gap.

19. The electromagnetic component of claim 1, wherein a physical air gap extends between a portion of the dual-winding arrangement and the magnetic core structure.

20. The electromagnetic component of claim 1, wherein the magnetic core structure has a length dimension, a width dimension, and a height dimension relative to the circuit board, wherein the first thickness is multiple times thicker than the second thickness along the width dimension, and wherein the first and second windings are equal along the length and width dimensions.

21. The electromagnetic component of claim 1, wherein the first thickness is five times of the second thickness.

* * * * *